United States Patent
Takatsu et al.

(10) Patent No.: US 12,535,236 B2
(45) Date of Patent: Jan. 27, 2026

(54) HEAT EXCHANGE VENTILATOR

(71) Applicant: Mitsubishi Electric Corporation, Tokyo (JP)

(72) Inventors: Ryo Takatsu, Tokyo (JP); Fumio Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 920 days.

(21) Appl. No.: 17/625,898

(22) PCT Filed: Aug. 9, 2019

(86) PCT No.: PCT/JP2019/031601
§ 371 (c)(1),
(2) Date: Jun. 27, 2022

(87) PCT Pub. No.: WO2021/028964
PCT Pub. Date: Feb. 18, 2021

(65) Prior Publication Data
US 2022/0333805 A1    Oct. 20, 2022

(51) Int. Cl.
*F24F 11/00* (2018.01)
*F24F 6/00* (2006.01)
(Continued)

(52) U.S. Cl.
CPC ............ *F24F 11/0001* (2013.01); *F24F 6/00* (2013.01); *F24F 7/08* (2013.01); *F24F 11/77* (2018.01);
(Continued)

(58) Field of Classification Search
CPC ........ F24F 11/0001; F24F 11/77; F24F 11/80; F24F 6/00; F24F 7/08; F24F 12/006;
(Continued)

(56) References Cited

U.S. PATENT DOCUMENTS

| | | | |
|---|---|---|---|
| 8,915,295 B2 * | 12/2014 | Norrell | F24F 11/745 165/298 |
| 2013/0048267 A1 * | 2/2013 | Koretomo | F24F 11/84 165/300 |

FOREIGN PATENT DOCUMENTS

| | | |
|---|---|---|
| CN | 101776295 A | 7/2010 |
| CN | 102939504 A | 2/2013 |

(Continued)

OTHER PUBLICATIONS

English translation of JP-6009102-B2, dated Nov. 22, 2024 (Year: 2024).*

(Continued)

*Primary Examiner* — Edelmira Bosques
*Assistant Examiner* — Brett Peterson Mallon
(74) *Attorney, Agent, or Firm* — BUCHANAN, INGERSOLL & ROONEY PC

(57) ABSTRACT

A heat exchange ventilator includes: a temperature adjustment coil provided downstream of the heat exchanger in a supply air passage to heat or cool supply air; a supply air temperature measurement unit provided downstream of the temperature adjustment coil in the supply air passage to measure a supply air temperature; and a control unit controlling operation of the blower unit and the temperature adjustment coil. The control unit performs blowing temperature moderation control of performing ventilation by controlling operation of at least one of the blower unit and the temperature adjustment coil to moderate blowing temperature of the supply air blown out from the casing, based on a result of comparison between a lower limit blowing temperature of the supply air blown out from the casing, an upper limit blowing temperature of the supply air blown out from the casing, and the supply air temperature.

16 Claims, 15 Drawing Sheets

(51) Int. Cl.
    *F24F 7/08*       (2006.01)
    *F24F 11/77*     (2018.01)
    *F24F 11/80*     (2018.01)
    *F24F 12/00*     (2006.01)
    *F24F 110/10*    (2018.01)
    *F24F 110/20*    (2018.01)

(52) U.S. Cl.
    CPC ............ *F24F 11/80* (2018.01); *F24F 12/006* (2013.01); *F24F 2011/0002* (2013.01); *F24F 2110/10* (2018.01); *F24F 2110/20* (2018.01)

(58) Field of Classification Search
    CPC ............... F24F 2110/20; F24F 2110/10; F24F 2011/0002; F24F 11/83
    See application file for complete search history.

(56) References Cited

FOREIGN PATENT DOCUMENTS

| CN | 104864536 | A | * | 8/2015 | ............ F24F 11/001 |
| CN | 109654684 | A | * | 4/2019 | |
| EP | 2607805 | A1 | | 6/2013 | |
| EP | 2650617 | A1 | * | 10/2013 | .......... F24F 11/0008 |
| JP | 2012193892 | A | | 10/2012 | |
| JP | 2014219153 | A | | 11/2014 | |
| JP | 5695861 | B2 | | 4/2015 | |
| JP | 6009102 | B2 | * | 10/2016 | ............ F24F 1/0003 |
| KR | 20030063844 | A | * | 7/2003 | |
| WO | 2012077201 | A1 | | 6/2012 | |
| WO | 2015087423 | A1 | | 6/2015 | |

OTHER PUBLICATIONS

English translation of KR-20030063844-A, dated Nov. 22, 2024 (Year: 2024).*
English translation of CN-104864536-A, dated Nov. 22, 2024 (Year: 2024).*
English translation of CN-109654684-A, dated Nov. 22, 2024 (Year: 2024).*
Decision of Refusal dated Jul. 12, 2023, issued in the corresponding Chinese Patent Application No. 201980098984.2, 31 pages including 22 pages of English Translation.
Office Action dated May 10, 2023, issued in the corresponding Chinese Patent Application No. 201980098984.2, 20 pages including 12 pages of Partial English Translation.
International Search Report (PCT/ISA/210) with translation and Written Opinion (PCT/ISA/237) mailed on Oct. 8, 2019, by the Japan Patent Office as the International Searching Authority for International Application No. PCT/JP2019/031601.
Extended European Search Report dated Jul. 11, 2022, issued in European Patent Application No. 19941482.2, 10 pages.
Office Action issued in corresponding CN Application No. 201980098984.2 mailed Nov. 2, 2022, 22 pages including 12 pages of English Translation.

* cited by examiner

HEAT EXCHANGE VENTILATOR

FIELD

The present invention relates to a heat exchange ventilator including a heat exchanger that causes heat exchange between airflows going through a supply air passage and an exhaust air passage.

BACKGROUND

Some conventionally known ventilators are attached to a space behind a ceiling and ventilate the room by supplying and discharging air via a duct. Patent Literature 1 discloses an outdoor-air treating air conditioner that automatically changes target values of pressure and blowing temperature to a predetermined target pressure and a predetermined target blowing temperature when an actual measured value of room temperature reaches a set value, controls the pressure and the blowing temperature at constant levels based on the target pressure and the target blowing temperature, and performs thermo-on and thermo-off control according to whether the difference between the actual measured value of room temperature and the set value has reached a set temperature difference.

CITATION LIST

Patent Literature

Patent Literature 1: Japanese Patent No. 5695861

SUMMARY

Technical Problem

However, the outdoor-air treating air conditioner described in Patent Literature 1 has been devised in order to improve the comfort of indoor air conditions, and the operation of the outdoor-air treating air conditioner is controlled at the target blowing temperature set for adjusting the indoor temperature based on the actual measured value of the indoor temperature. In addition, it is not considered whether the blowing temperature, which is the temperature of the supply air blown into the room from the outdoor-air treating air conditioner, is comfortable or uncomfortable for the user in the room.

Therefore, the outdoor-air treating air conditioner described in Patent Literature 1 may produce a state in which the temperature of the supply air is so high that the user feels uncomfortable, or the temperature of the supply air is so low that the user feels uncomfortable.

The present invention has been made in view of the above, and an object thereof is to obtain a heat exchange ventilator capable of performing ventilation in which supply air comfortable for the user in the room is supplied into the room.

Solution to Problem

In order to solve the above-described problems and achieve the object, a heat exchange ventilator according to the present invention includes: a casing in which an exhaust air passage through which indoor air is discharged out of a room and a supply air passage through which outdoor air is supplied into the room are independently formed; a blower unit including an exhaust blower that generates an exhaust airflow going through the exhaust air passage and an air supply blower that generates a supply airflow going through the supply air passage; and a heat exchanger that causes heat exchange between the supply airflow and the exhaust airflow. The heat exchange ventilator also includes: a temperature adjustment coil provided downstream of the heat exchanger in the supply air passage to heat or cool supply air that is the outdoor air passing through the supply air passage; a supply air temperature measurement unit provided downstream of the temperature adjustment coil in the supply air passage to measure a supply air temperature that is a temperature of the supply air passed through the temperature adjustment coil; and a control unit that controls operation of the blower unit and the temperature adjustment coil. The control unit performs blowing temperature moderation control of performing ventilation by controlling operation of at least one of the blower unit and the temperature adjustment coil so as to moderate a blowing temperature of the supply air blown out from the casing, the controlling being based on a result of comparison between a lower limit blowing temperature defining a lower limit of the blowing temperature of the supply air blown out from the casing, an upper limit blowing temperature defining an upper limit of the blowing temperature of the supply air blown out from the casing, and the supply air temperature.

Advantageous Effects of Invention

The heat exchange ventilator according to the present invention can achieve the effect of performing ventilation in which supply air comfortable for the user in the room is supplied into the room.

DESCRIPTION OF EMBODIMENTS

Hereinafter, a heat exchange ventilator according to embodiments of the present invention will be described in detail based on the drawings. The present invention is not limited to the embodiments.

FIRST EMBODIMENT

Figure 1:
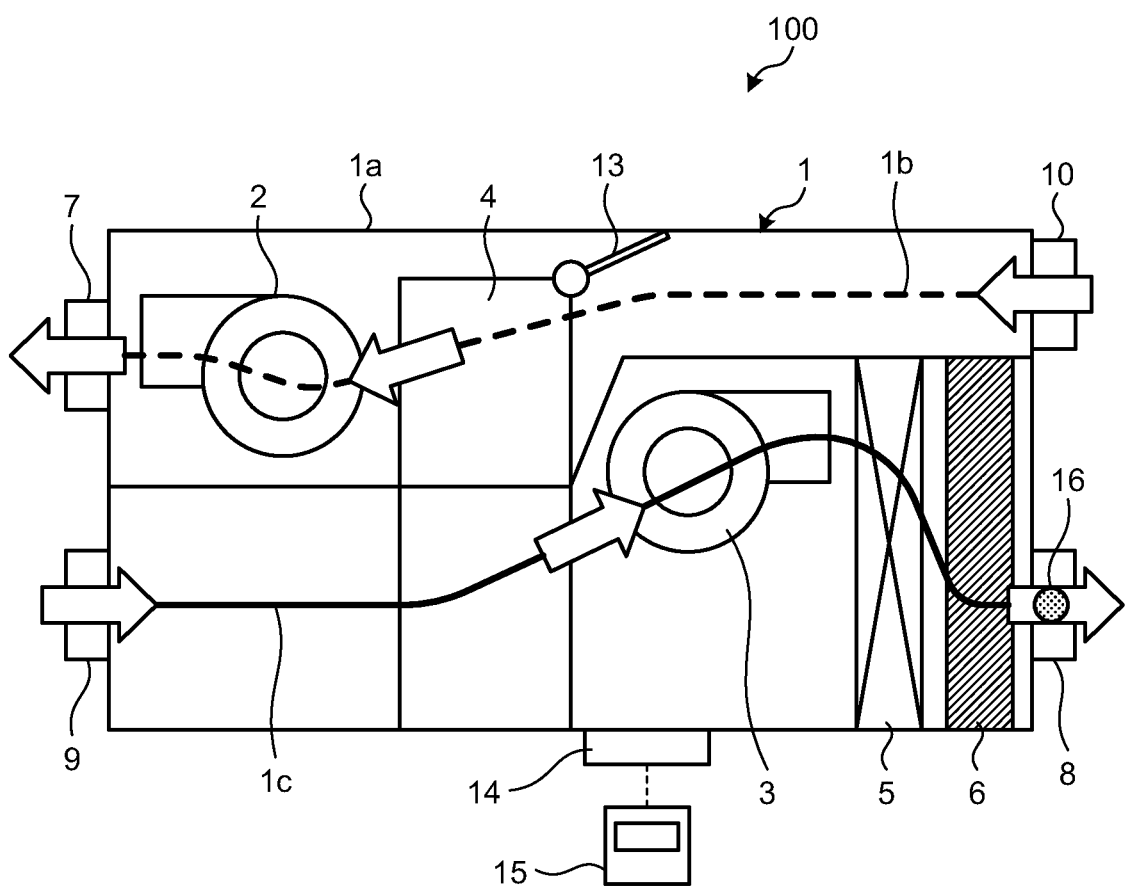
FIG. 1 is a schematic plan view illustrating the internal configuration of a heat exchange ventilator according to a first embodiment of the present invention, with a damper open.
Figure 2:
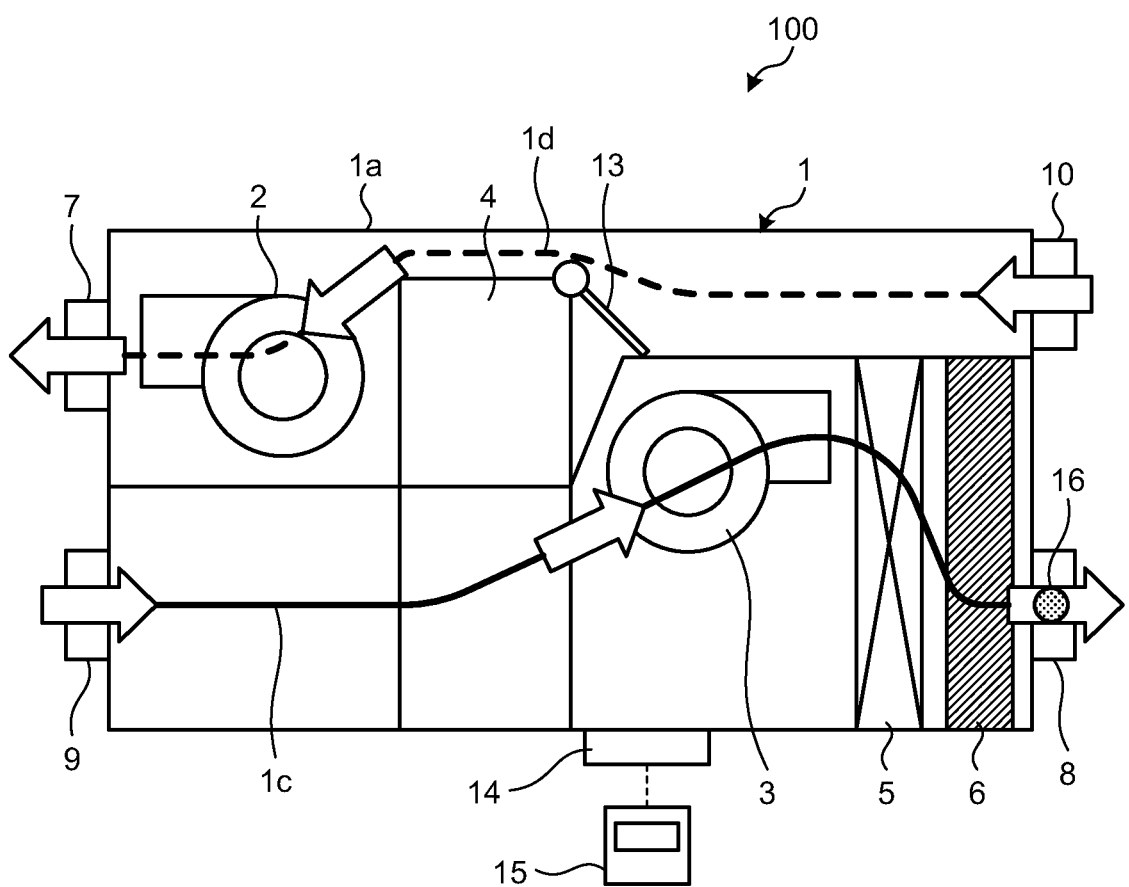
FIG. 2 is a schematic plan view illustrating the internal configuration of the heat exchange ventilator according to the first embodiment of the present invention, with the damper closed.
Figure 3:
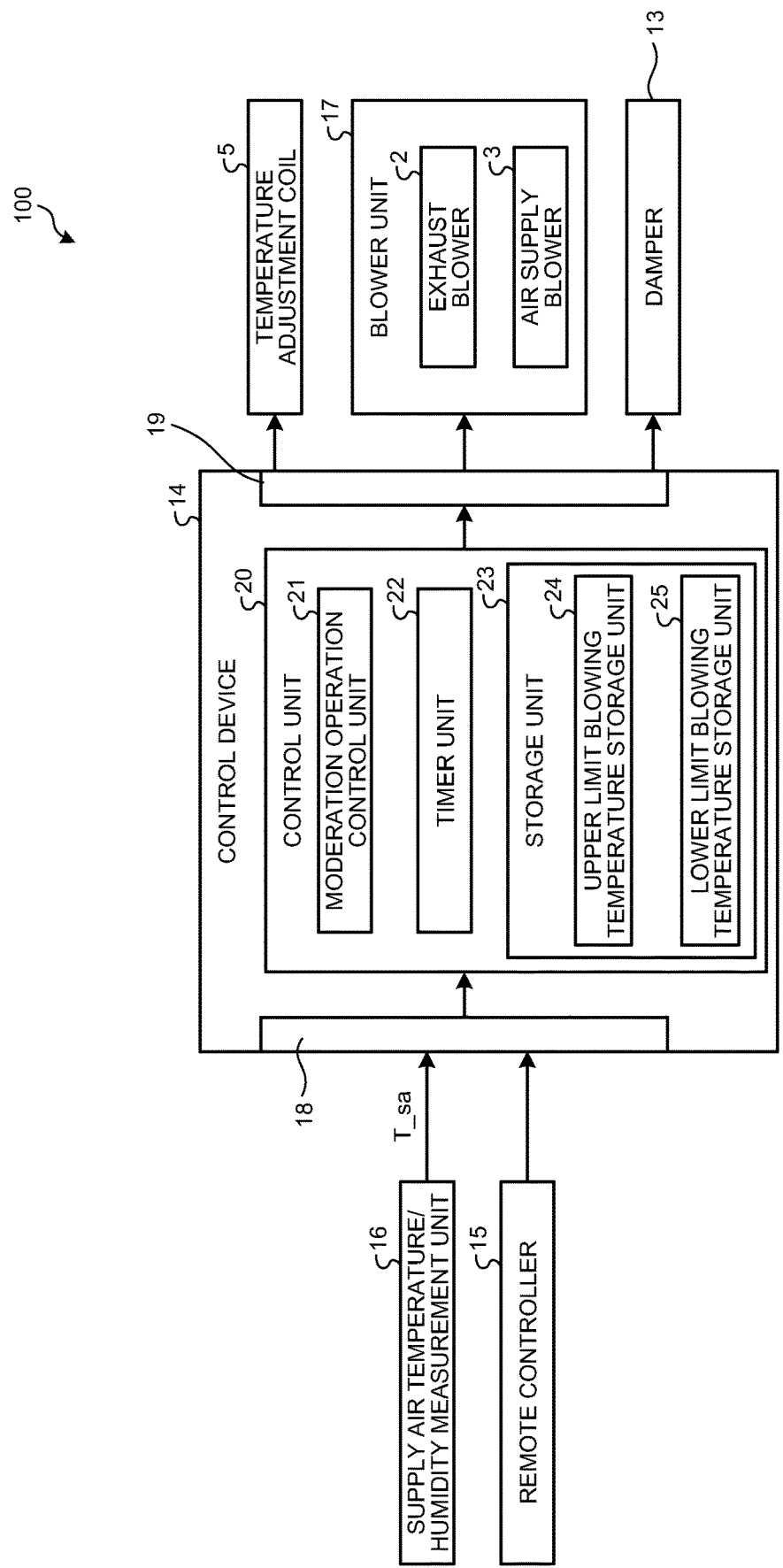
FIG. 3 is a diagram illustrating a functional configuration related to the operation of the heat exchange ventilator according to the first embodiment of the present invention.

FIG. 1 is a schematic plan view illustrating the internal configuration of a heat exchange ventilator 100 according to a first embodiment of the present invention, with a damper 13 open. FIG. 2 is a schematic plan view illustrating the internal configuration of the heat exchange ventilator 100 according to the first embodiment of the present invention, with the damper 13 closed. FIG. 3 is a diagram illustrating a functional configuration related to the operation of the heat exchange ventilator 100 according to the first embodiment of the present invention.

The heat exchange ventilator 100 includes a main body 1, a control device 14, and a remote controller 15. The main body 1 is a heat exchange ventilator that is a ventilator for air conditioning including a total heat exchanger 4 inside a casing 1a constituting the box body of the ventilator. The main body 1 is hidden behind the ceiling. The remote controller 15 is installed in the room.

The casing 1a includes an exhaust outlet 7 and an air supply inlet 9 on the side surface corresponding to the outdoor side, and an air supply outlet 8 and an exhaust inlet 10 on the side surface corresponding to the indoor side. Inside the casing 1a, a heat exchange exhaust air passage 1b and a supply air passage 1c are formed. The heat exchange exhaust air passage 1b is an exhaust air passage that communicates the exhaust inlet 10 and the exhaust outlet 7 to discharge indoor air out of the room. The supply air passage 1c communicates the air supply inlet 9 and the air supply outlet 8 to supply outdoor air into the room. The heat exchange exhaust air passage 1b and the supply air passage 1c are provided independently of each other over the entire path. For the heat exchange ventilator 100, outdoor air is supply air, i.e. air that is supplied into the room. Indoor air is exhaust air, i.e. air that is discharged out of the room.

The heat exchange ventilator 100 is equipped with the total heat exchanger 4 that is a heat exchanger that performs total heat exchange between airflows going through the supply air passage 1c and the heat exchange exhaust air passage 1b. The total heat exchanger 4 causes continuous heat exchange between an exhaust airflow, i.e. airflow of indoor air passing through the heat exchange exhaust air passage 1b, and a supply airflow, i.e. airflow of outdoor air passing through the supply air passage 1c. The total heat exchanger 4 includes a primary-side air passage through which the exhaust airflow passes and a secondary-side air passage through which the supply airflow passes. In the total heat exchanger 4, the primary-side air passage and the secondary-side air passage cross each other at a right angle, and total heat is exchanged between the airflow going through the primary-side air passage and the airflow going through the secondary-side air passage, so that heat exchange ventilation can be performed.

Inside the casing 1a, a bypass exhaust air passage 1d is formed, which is an exhaust air passage provided side by side with the heat exchange exhaust air passage 1b. The bypass exhaust air passage 1d is an air passage that bypasses the total heat exchanger 4 from the exhaust inlet 10 to the exhaust outlet 7, that is, an air passage for causing the exhaust airflow to be discharged to the exhaust outlet 7 without passing through the total heat exchanger 4. Causing the exhaust airflow, which is the airflow of indoor air sucked through the exhaust inlet 10, to go through the heat exchange exhaust air passage 1b to pass through the total heat exchanger 4 enables heat exchange ventilation, which involves heat exchange between the supply airflow and the exhaust airflow. On the other hand, causing the exhaust airflow, which is the airflow of indoor air sucked through the exhaust inlet 10, to go through the bypass exhaust air passage 1d so as not to pass through the total heat exchanger 4 enables normal ventilation, which does not involve heat exchange between the supply airflow and the exhaust airflow.

Inside the casing 1a, the electric damper 13 is provided where the heat exchange exhaust air passage 1b and the bypass exhaust air passage 1d separate. The damper 13 is an air passage switching damper for switching between the heat exchange exhaust air passage 1b and the bypass exhaust air passage 1d. The damper 13 has a rotation shaft at the separation point between the heat exchange exhaust air passage 1b and the bypass exhaust air passage 1d, and constitutes an air passage switching unit that switches between the heat exchange exhaust air passage 1b and the bypass exhaust air passage 1d according to whether the indoor air sucked through the exhaust inlet 10 is to pass through the total heat exchanger 4. The damper 13 includes, for example, a plate that rotates inside the exhaust air passage, and is capable of switching between the heat exchange exhaust air passage 1b and the bypass exhaust air passage 1d by changing the direction.

FIG. 1 shows that the damper 13 is placed at a position where the bypass exhaust air passage 1d is closed, that is, at a heat exchange ventilation position that enables total heat exchange ventilation operation, and the exhaust air passage is switched to the heat exchange exhaust air passage 1b. On the other hand, FIG. 2 shows that opening the bypass exhaust air passage 1d with the damper 13 enables bypass ventilation in which indoor air is discharged out of the room without passing through the total heat exchanger 4. As a result, it is possible to perform normal ventilation, which does not involve heat exchange between the supply airflow and the exhaust airflow.

The casing 1a includes an air supply blower 3 that is provided in the supply air passage 1c and generates the supply airflow from the air supply inlet 9 toward the air supply outlet 8. The casing 1a also includes an exhaust blower 2 that is provided at a position downstream of the total heat exchanger 4 in the portion shared by the heat exchange exhaust air passage 1b and the bypass exhaust air passage 1d, and generates the exhaust airflow from the exhaust inlet 10 toward the exhaust outlet 7. The air supply blower 3 and the exhaust blower 2 constitute a blower unit 17 that generates airflow for ventilating the room.

The air supply blower 3 includes therein an air supply motor (not illustrated) for driving the air supply blower 3. The exhaust blower 2 includes therein an exhaust motor (not illustrated) for driving the exhaust blower 2. The rotational speeds of the air supply motor and the exhaust motor change under the control of a control unit 20 (described later).

The casing 1a includes a supply air temperature/humidity measurement unit 16 that is provided in the supply air passage 1c and is capable of measuring supply air temperature and humidity. The supply air temperature is the temperature of the supply air that is the outdoor air supplied into the room through the air supply outlet 8. Specifically, the supply air temperature/humidity measurement unit 16 is capable of measuring the temperature and humidity of the supply air that is blown out from the casing 1a into the room after passing through a temperature adjustment coil 5 (described later). The supply air temperature/humidity measurement unit 16 includes an element capable of detecting temperature and humidity. Note that a supply air temperature measurement unit capable of measuring the temperature of the supply air and a supply air humidity measurement unit capable of measuring the humidity of the supply air may be separately provided. Here, the supply air temperature, which is the temperature of the supply air that is the outdoor air supplied into the room through the air supply outlet 8, can be rephrased as the blowing temperature of the supply air.

The temperature adjustment coil 5 is placed at a position downstream of the air supply blower 3 in the supply air passage 1c. The temperature adjustment coil 5 is a heat exchanger capable of adjusting the temperature of the supply air by heating or cooling the supply airflow passing through the downstream side of the air supply blower 3 in the supply air passage 1c by means of the refrigerant therein.

The operation of the temperature adjustment coil 5 is controlled by the control unit 20 (described later) to adjust the temperature of the supply airflow passing through the downstream side of the total heat exchanger 4 in the supply air passage 1c such that the indoor temperature reaches a target temperature set by the user.

Specifically, when the air passes through the temperature adjustment coil 5 after passing through the total heat exchanger 4, the temperature adjustment coil 5 can perform heating operation, i.e. heat the passing air. In addition, when the air passes through the temperature adjustment coil 5 after passing through the total heat exchanger 4, the temperature adjustment coil 5 can perform cooling operation, i.e. cool the passing air. The capability of the temperature adjustment coil 5 is adjusted by changing the opening degree of an electronic expansion valve control device that is a throttle device for adjusting the flow rate of refrigerant through the temperature adjustment coil 5.

The temperature adjustment coil 5 is controlled to switch between thermo-on and thermo-off under the control of the control unit 20 (described later). Thermo-on refers to a state in which the refrigerant flows in the temperature adjustment coil 5 and heat exchange is performed between the air around the temperature adjustment coil 5 and the refrigerant. In other words, thermo-on is a state in which the refrigerant circulates through the temperature adjustment coil 5. Thermo-off refers to a state in which the refrigerant does not flow in the temperature adjustment coil 5 and heat exchange is not performed between the air around the temperature adjustment coil 5 and the refrigerant. In other words, thermo-off is a state in which the refrigerant does not circulate through the temperature adjustment coil 5.

The heating capacity and the cooling capacity of the temperature adjustment coil 5 can be changed in multiple stages. For example, the heating capacity and the cooling capacity of the temperature adjustment coil 5 can be controlled in four stages of 100%, 50%, 25%, and 0%, with 100% being the maximum capacity. However, the number of stages of the capability of the temperature adjustment coil 5 can be larger than four stages, or can be smaller than four stages, and the capability of each stage can be freely selected.

Placed at a position downstream of the temperature adjustment coil 5 in the supply air passage 1c is a humidifier 6 that humidifies the supply airflow passing through the temperature adjustment coil 5. The humidifier 6 functions as a humidifying air passage unit that humidifies the supply airflow blown out from the outlet of the air supply blower 3 in the casing 1a.

As illustrated in FIG. 3, the control device 14 includes the control unit 20 which is a control unit that controls the operation of the blower unit 17 including the exhaust blower 2 and the air supply blower 3, the temperature adjustment coil 5, and the damper 13 to control the ventilation operation of the heat exchange ventilator 100. The control unit 20 includes a moderation operation control unit 21 that controls blowing temperature moderation operation, a timer unit 22 having a timer function, and a storage unit 23 that stores various types of information related to the control of the ventilation operation of the heat exchange ventilator 100. The control device 14 also includes an input interface 18 which is an input interface between the control unit 20 and components such as the remote controller 15 and the supply air temperature/humidity measurement unit 16, and an output interface 19 which is an output interface between the control unit 20 and components such as the temperature adjustment coil 5, the blower unit 17, and the damper 13.

The control unit 20 is placed at a position outside the casing 1a where maintenance can be easily performed, and controls the air supply blower 3, the exhaust blower 2, the temperature adjustment coil 5, and the damper 13 to control the ventilation operation of the heat exchange ventilator 100. That is, the control unit 20 is communicable with the air supply blower 3 and the exhaust blower 2 via a communication line, and performs on/off control of the ventilation operation and air volume control of the air supply blower 3 and the exhaust blower 2 as basic operations of the heat exchange ventilator 100.

The heat exchange ventilator 100 is operable in three stages of air volume, for example, weak air operation that produces a weak stream of air, i.e. the smallest volume of air, moderate air operation that produces a moderate stream of air, i.e. a larger volume of air than in weak air operation, and strong air operation that produces a strong stream of air, i.e. a larger volume of air than in moderate air operation. That is, the air volumes of the exhaust blower 2 and the air supply blower 3 can be controlled in three stages: strong, moderate, and weak in descending order of air volume.

In addition, as basic operations of the heat exchange ventilator 100, the control unit 20 can control switching of the temperature adjustment coil 5 between thermo-on and thermo-off, switching of the temperature adjustment coil 5 between heating operation and cooling operation, and change of heating capacity and cooling capacity, as control of the operation of the temperature adjustment coil 5. By switching the temperature adjustment coil 5 to thermo-off, air blowing operation is performed, in which the supply airflow is not heated or cooled. In addition, the control unit 20 performs on/off control of humidification in the humidifier 6 as a basic operation of the heat exchange ventilator 100.

The timer unit 22 counts a thermo-off enabling timer value t_off and a thermo-on enabling timer value t_on in thermo determination (described later).

The storage unit 23 stores various types of information related to the operation of the heat exchange ventilator 100. The storage unit 23 includes an upper limit blowing temperature storage unit 24 that stores an upper limit blowing temperature Tlim_HI, and a lower limit blowing temperature storage unit 25 that stores a lower limit blowing temperature Tlim_LO. As the storage unit 23, a non-volatile storage device is used so that the stored information is not erased after the power to the heat exchange ventilator 100 is turned off. The storage unit 23 is implemented by a memory, for example.

The upper limit blowing temperature Tlim_HI is a temperature defining the upper limit of the blowing temperature of the supply air blown into the room from the casing 1a in the ventilation operation of the heat exchange ventilator 100 as the upper limit of the range of blowing temperatures of the supply air with which the user in the room feels comfortable. As will be described later, the upper limit blowing temperature Tlim_HI is used as a threshold temperature for determining whether the blowing temperature, which is the temperature of the supply air blown into the room from the casing 1a, is comfortable or uncomfortable for the user in the room. The upper limit blowing temperature Tlim_HI is sent from the remote controller 15 to the control unit 20 via the input interface 18, and is set and stored in the upper limit blowing temperature storage unit 24 of the storage unit 23 under the control of the control unit 20. The upper limit blowing temperature Tlim_HI can be changed to any value using the remote controller 15 via the input interface 18.

The lower limit blowing temperature Tlim_LO is a temperature defining the lower limit of the blowing temperature of the supply air blown into the room from the casing 1a in the ventilation operation of the heat exchange ventilator 100 as the lower limit of the range of blowing temperatures of the supply air with which the user in the room feels comfortable. As will be described later, the lower limit blowing temperature Tlim_LO is used as a threshold temperature for determining whether the blowing temperature, which is the temperature of the supply air blown into the room from the casing 1a, is comfortable or uncomfortable for the user in the room. The lower limit blowing temperature Tlim_LO is sent from the remote controller 15 to the control unit 20 via the input interface 18, and is set and stored in the lower limit blowing temperature storage unit 25 of the storage unit 23 under the control of the control unit 20. The lower limit blowing temperature Tlim_LO can be changed to any value using the remote controller 15 via the input interface 18.

The temperature range from the lower limit blowing temperature Tlim_LO to the upper limit blowing temperature Tlim_HI is the range of blowing temperatures with which the user feels comfortable.

The moderation operation control unit 21 controls the blowing temperature moderation operation of performing ventilation by controlling the operation of at least one of the blower unit 17 and the temperature adjustment coil 5 so as to moderate the blowing temperature, the controlling being based on a result of comparison between the lower limit blowing temperature defining the lower limit of the blowing temperature of the supply air blown out from the casing 1a, the upper limit blowing temperature defining the upper limit of the blowing temperature of the supply air blown out from the casing 1a, and the supply air temperature. Details of the blowing temperature moderation operation will be described later.

The remote controller 15 is a terminal with which the user performs at least an action related to starting and stopping the operation of the heat exchange ventilator 100. The remote controller 15 receives commands for various controls on the ventilation operation of the heat exchange ventilator 100 and the like. The remote controller 15 transmits various commands received from the user to the control unit 20 of the control device 14. That is, the remote controller 15 can turn the heat exchange ventilator 100 on and off, switch the ventilation air volume, switch the ventilation mode, set an operation timer, and the like. The remote controller 15 is exemplified by a remote controller, a computer with an operation application installed, a tablet terminal, a smartphone, or the like.

A supply air temperature T_sa measured by the supply air temperature/humidity measurement unit 16 and information input from the remote controller 15 are sent to the moderation operation control unit 21 via the input interface 18. A control signal transmitted from the moderation operation control unit 21 is transmitted to the blower unit 17, the temperature adjustment coil 5, and the damper 13 via the output interface 19. The blower unit 17, the temperature adjustment coil 5, and the damper 13 change the output of the blower unit 17, the output of the temperature adjustment coil 5, or the opening/closing operation of the damper 13 according to the received control signal. The output of the blower unit 17 is the output of the air supply blower 3 and the exhaust blower 2.

Next, the blowing temperature moderation operation of the heat exchange ventilator 100 will be described. First, blowing temperature discomfort determination in the control of the blowing temperature moderation operation of the heat exchange ventilator 100 will be described. The blowing temperature discomfort determination is a determination as to whether the blowing temperature, which is the current temperature of the supply air, is comfortable or uncomfortable for the user in the room.

Figure 4:
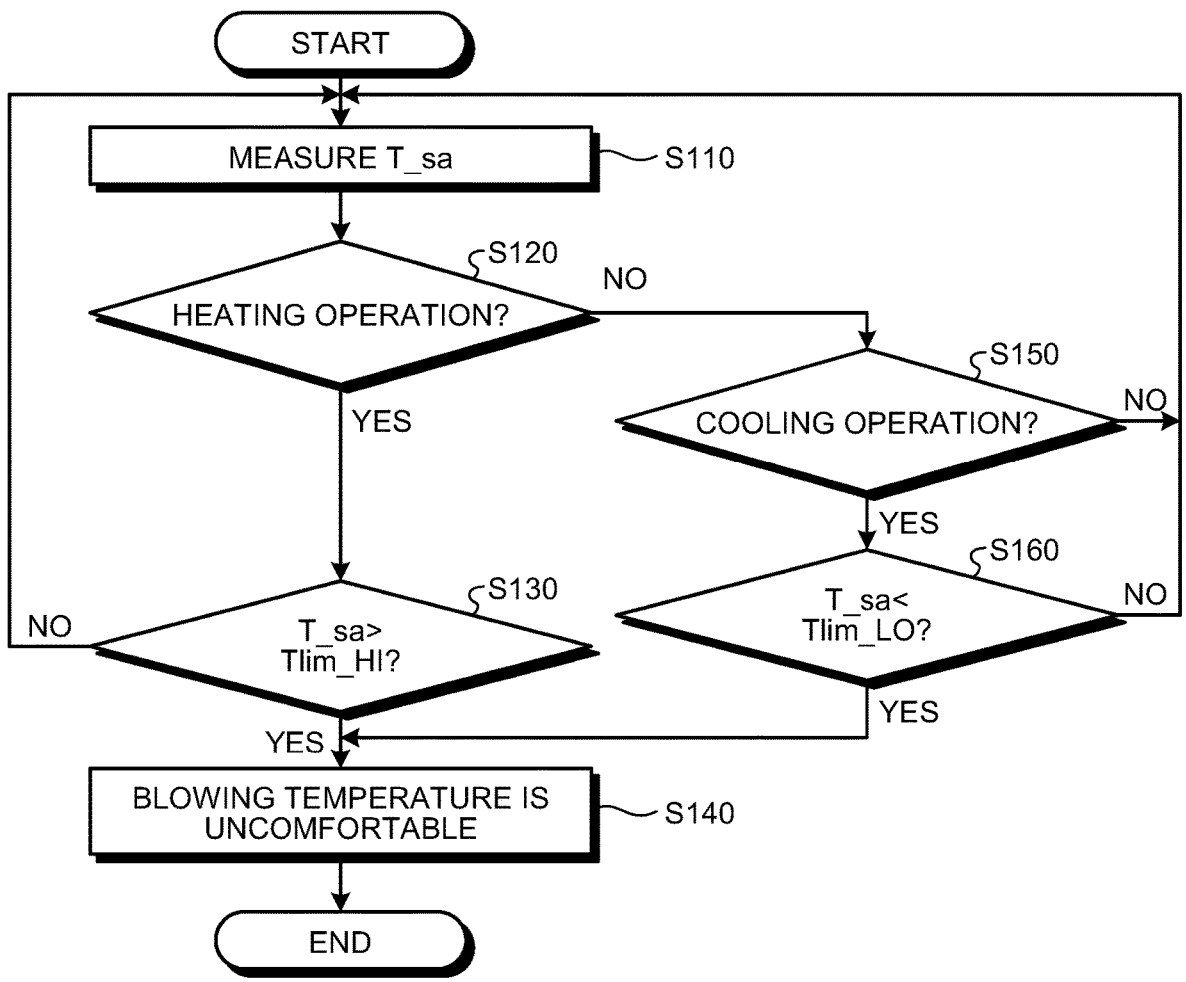
FIG. 4 is a flowchart illustrating a procedure for blowing temperature discomfort determination in the control of the blowing temperature moderation operation of the heat exchange ventilator according to the first embodiment of the present invention.

FIG. 4 is a flowchart illustrating a procedure for blowing temperature discomfort determination in the control of the blowing temperature moderation operation of the heat exchange ventilator 100 according to the first embodiment of the present invention. In the blowing temperature moderation operation, the moderation operation control unit 21 compares the upper limit blowing temperature Tlim_HI or the lower limit blowing temperature Tlim_LO with the supply air temperature T_sa to determine whether the current temperature of the supply air is comfortable or uncomfortable. The supply air temperature T_sa is the temperature of the supply air blown out from the casing 1a, that is, the blowing temperature of the supply air blown out from the casing 1a measured by the supply air temperature/humidity measurement unit 16.

First, in step S110, the supply air temperature/humidity measurement unit 16 measures the supply air temperature T_sa at predetermined measurement intervals. The supply air temperature/humidity measurement unit 16 transmits information on the measured supply air temperature T_sa to the moderation operation control unit 21. After step S110, the procedure proceeds to step S120.

In step S120, the moderation operation control unit 21 determines whether the current operation mode of the temperature adjustment coil 5 is heating operation. The moderation operation control unit 21 acquires information on the control mode of the temperature adjustment coil 5 from the control unit 20, and determines whether the current operation mode is heating operation based on the information on the control mode of the temperature adjustment coil 5. Determining in step S120 that the operation mode is heating operation corresponds to Yes in step S120, in which case the procedure proceeds to step S130. Determining in step S120 that the operation mode is not heating operation corresponds to No in step S120, in which case the procedure proceeds to step S150.

In step S130, the moderation operation control unit 21 determines whether the supply air temperature T_sa is higher than the upper limit blowing temperature Tlim_HI. Determining in step S130 that the supply air temperature T_sa is higher than the upper limit blowing temperature Tlim_HI corresponds to Yes in step S130, in which case the procedure proceeds to step S140.

In step S140, the moderation operation control unit 21 determines that the blowing temperature of the supply air blown out from the casing 1a is uncomfortable.

Determining in step S130 that the supply air temperature T_sa is lower than or equal to the upper limit blowing temperature Tlim_HI corresponds to No in step S130, in which case the procedure returns to step S110. Upon the determination that the supply air temperature T_sa is lower than or equal to the upper limit blowing temperature Tlim_HI, the moderation operation control unit 21 determines that the blowing temperature of the supply air blown out from the casing 1a is not uncomfortable.

In step S150, the moderation operation control unit 21 determines whether the current operation mode of the temperature adjustment coil 5 is cooling operation. Determining in step S150 that the operation mode is cooling operation corresponds to Yes in step S150, in which case the procedure proceeds to step S160. Determining in step S150 that the operation mode is not cooling operation corresponds to No in step S150, in which case the procedure returns to step S110.

In step S160, the moderation operation control unit 21 determines whether the supply air temperature T_sa is lower than the lower limit blowing temperature Tlim_LO. Determining in step S160 that the supply air temperature T_sa is lower than the lower limit blowing temperature Tlim_LO corresponds to Yes in step S160, in which case the procedure proceeds to step S140.

Determining in step S160 that the supply air temperature T_sa is higher than or equal to the lower limit blowing temperature Tlim_LO corresponds to No in step S160, in which case the procedure returns to step S110. Upon the determination that the supply air temperature T_sa is higher than or equal to the lower limit blowing temperature Tlim_LO, the moderation operation control unit 21 determines that the blowing temperature of the supply air blown out from the casing 1a is not uncomfortable.

Figure 5:
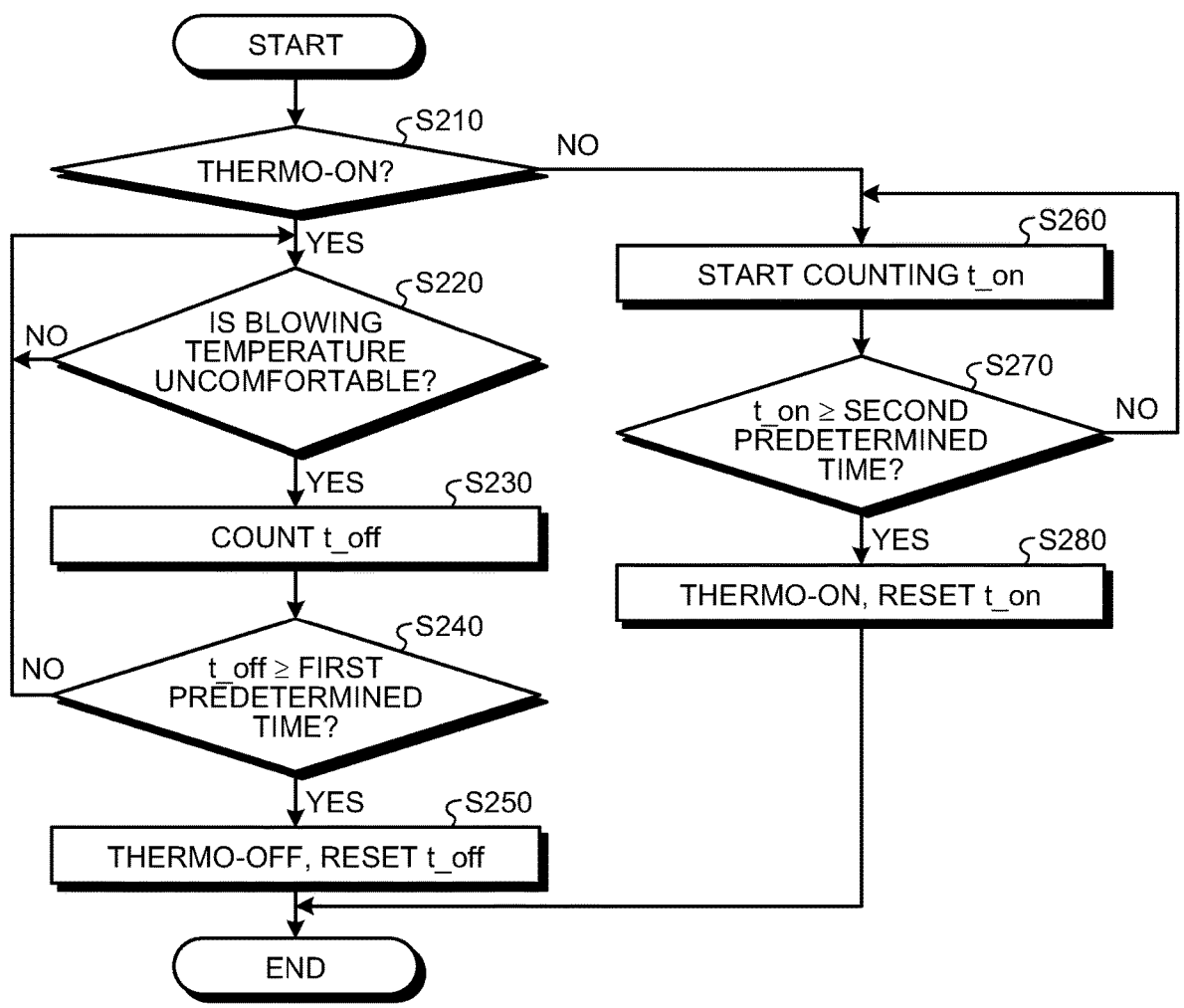
FIG. 5 is a flowchart illustrating a procedure for thermo determination in the control of the blowing temperature moderation operation of the heat exchange ventilator according to the first embodiment of the present invention.

Next, thermo determination in the control of the blowing temperature moderation operation of the heat exchange ventilator 100 will be described. FIG. 5 is a flowchart illustrating a procedure for thermo determination in the control of the blowing temperature moderation operation of the heat exchange ventilator 100 according to the first embodiment of the present invention. In the blowing temperature moderation operation, switching of the temperature adjustment coil 5 between thermo-on and thermo-off is controlled using the result of determining whether the blowing temperature is comfortable or uncomfortable based on the procedure illustrated in the flowchart of FIG. 4.

First, in step S210, the moderation operation control unit 21 determines whether the temperature adjustment coil 5 is currently in thermo-on. The moderation operation control unit 21 acquires information on the control mode of the temperature adjustment coil 5 from the control unit 20, and determines whether the temperature adjustment coil 5 is in thermo-on based on the information on the control mode of the temperature adjustment coil 5. Determining in step S210 that the temperature adjustment coil 5 is in thermo-on corresponds to Yes in step S210, in which case the procedure proceeds to step S220. Determining in step S210 that the temperature adjustment coil 5 is not in thermo-on corresponds to No in step S210, in which case the procedure proceeds to step S260.

In step S220, it is determined whether the blowing temperature is uncomfortable according to the procedure illustrated in the flowchart of FIG. 4. Determining in step S220 that the blowing temperature is uncomfortable corresponds to Yes in step S220, in which case the procedure proceeds to step S230. Determining in step S220 that the blowing temperature is not uncomfortable corresponds to No in step S220, in which case the procedure returns to step S220.

In step S230, the timer unit 22 counts the thermo-off enabling timer value t_off. Counting the thermo-off enabling timer value t_off means counting the time during which the blowing temperature is determined as uncomfortable, that is, counting the time during which the supply air temperature is higher than the upper limit blowing temperature Tlim_HI or less than the lower limit blowing temperature Tlim_LO. In the thermo determination, the temperature adjustment coil 5 is controlled to be in thermo-off in response to the count time of the thermo-off enabling timer value t_off reaching or exceeding a first predetermined time determined in advance. As a result, it is possible to prevent the temperature adjustment coil 5 from being frequently switched between thermo-on and thermo-off due to fluctuations in the measured value of the supply air temperature T_sa measured by the supply air temperature/humidity measurement unit 16.

The first predetermined time is a threshold time for the moderation operation control unit 21 to determine whether to switch the temperature adjustment coil 5 to thermo-off while the temperature adjustment coil 5 is in the thermo-on state and the blowing temperature is determined as uncomfortable. The first predetermined time can be changed to any time. An example of the first predetermined time is 15 minutes, for example. After step S230, the procedure proceeds to step S240.

In step S240, the moderation operation control unit 21 determines whether the count time of the thermo-off enabling timer value t_off is greater than or equal to the first predetermined time determined in advance. Determining in step S240 that the count time of the thermo-off enabling timer value t_off is greater than or equal to the first predetermined time corresponds to Yes in step S240, in which case the procedure proceeds to step S250.

Determining in step S240 that the count time of the thermo-off enabling timer value t_off is less than the first predetermined time corresponds to No in step S240, in which case the procedure returns to step S220.

In step S250, the moderation operation control unit 21 switches the temperature adjustment coil 5 to thermo-off, and resets the count of the thermo-off enabling timer value t_off.

In step S260, the timer unit 22 starts counting the thermo-on enabling timer value t_on. In the thermo determination, the temperature adjustment coil 5 is controlled to be in thermo-on in response to the count time of the thermo-on enabling timer value t_on reaching or exceeding a second predetermined time determined in advance.

The second predetermined time is a threshold time for the moderation operation control unit 21 to determine whether to switch the temperature adjustment coil 5 from thermo-off to thermo-on, and can be changed to any time. An example of the second predetermined time is 15 minutes, for example. After step S260, the procedure proceeds to step S270.

In step S270, the moderation operation control unit 21 determines whether the count time of the thermo-on enabling timer value t_on is greater than or equal to the second predetermined time. Determining in step S270 that the count time of the thermo-on enabling timer value t_on is greater than or equal to the second predetermined time corresponds to Yes in step S270, in which case the procedure proceeds to step S280.

Determining in step S270 that the count time of the thermo-on enabling timer value t_on is less than the second predetermined time corresponds to No in step S270, in which case the procedure returns to step S260 to continue counting the thermo-on enabling timer value t_on.

In step S280, the moderation operation control unit 21 switches the temperature adjustment coil 5 to thermo-on, and resets the count of the thermo-on enabling timer value t_on.

By performing the above processes, while the temperature adjustment coil 5 is in thermo-on, it is possible to perform control to switch the temperature adjustment coil 5 to thermo-off in response to the time during which the supply air temperature is higher than the upper limit blowing temperature Tlim_HI or the time during which the supply air temperature is lower than the lower limit blowing temperature Tlim_LO lasting for the first predetermined time or more determined in advance. In addition, when step S210 is performed again after the temperature adjustment coil 5 is switched to thermo-off in step S250, it is possible to perform control to switch the temperature adjustment coil 5 to thermo-on after a lapse of the second predetermined time determined in advance. As a result, it is possible to prevent the temperature adjustment coil 5 from being frequently switched between thermo-on and thermo-off due to fluctuations in the measured value of the supply air temperature T_sa measured by the supply air temperature/humidity measurement unit 16, that is, to prevent hunting in switching between thermo-on and thermo-off, and to stabilize the control.

Figure 6:
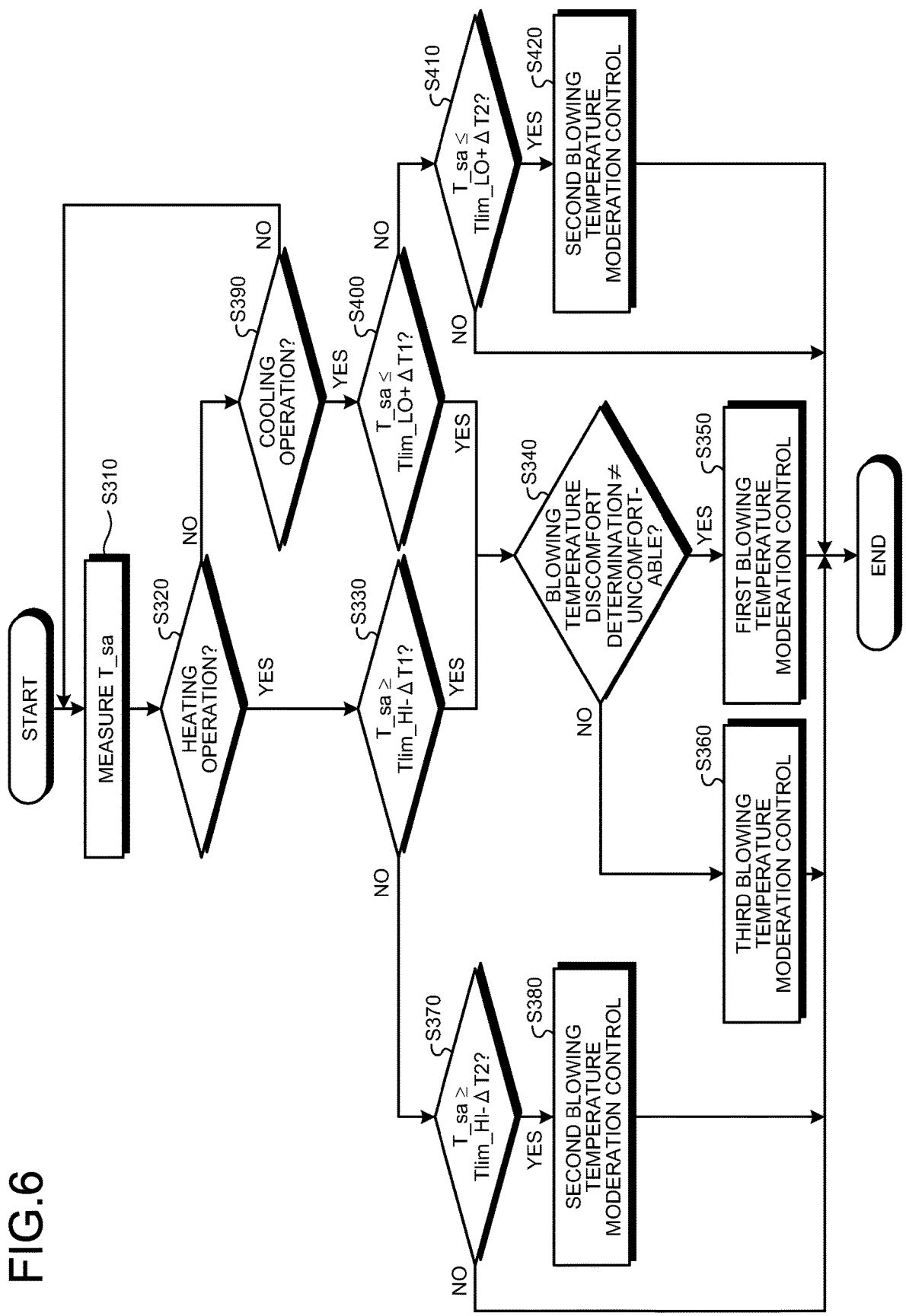
FIG. 6 is a flowchart illustrating a procedure for the blowing temperature moderation operation of the heat exchange ventilator according to the first embodiment of the present invention.

Next, the control of the blowing temperature moderation operation of the heat exchange ventilator 100 will be described. FIG. 6 is a flowchart illustrating a procedure for the blowing temperature moderation operation of the heat exchange ventilator 100 according to the first embodiment of the present invention.

First, in step S310, the supply air temperature/humidity measurement unit 16 measures the supply air temperature T_sa at predetermined measurement intervals. The supply air temperature/humidity measurement unit 16 transmits information on the measured supply air temperature T_sa to the moderation operation control unit 21. After step S310, the procedure proceeds to step S320.

In step S320, the moderation operation control unit 21 determines whether the current operation mode of the temperature adjustment coil 5 is heating operation. The moderation operation control unit 21 acquires information on the control mode of the temperature adjustment coil 5 from the control unit 20, and determines whether the current operation mode is heating operation based on the information on the control mode of the temperature adjustment coil 5. Determining in step S320 that the operation mode is heating operation corresponds to Yes in step S320, in which case the procedure proceeds to step S330. Determining in step S320 that the operation mode is not heating operation corresponds to No in step S320, in which case the procedure proceeds to step S390.

In step S330, the moderation operation control unit 21 determines whether the supply air temperature T_sa is higher than or equal to "upper limit blowing temperature Tlim_HI-$\Delta$T1". Determining in step S330 that the supply air temperature T_sa is higher than or equal to "upper limit blowing temperature Tlim_HI-$\Delta$T1" corresponds to Yes in step S330, in which case the procedure proceeds to step S340. Determining in step S330 that the supply air temperature T_sa is lower than "upper limit blowing temperature Tlim_HI-$\Delta$T1" corresponds to No in step S330, in which case the procedure proceeds to step S370.

$\Delta$T1 is a first correction value for dividing the temperature region between the upper limit blowing temperature Tlim_HI and the lower limit blowing temperature Tlim_LO with respect to the upper limit blowing temperature Tlim_HI or the lower limit blowing temperature Tlim_LO in order to determine which of a plurality of blowing temperature moderation controls implementable by the moderation operation control unit 21 is to be performed when the moderation operation control unit 21 performs the blowing temperature moderation operation.

In step S340, the blowing temperature discomfort determination is performed according to the procedures illustrated in the flowcharts of FIGS. 4 and 5, and it is determined whether the result of the blowing temperature discomfort determination indicates "not uncomfortable". The result of the blowing temperature discomfort determination indicating "not uncomfortable" corresponds to Yes in step S340, in which case the procedure proceeds to step S350. The result of the blowing temperature discomfort determination indicating "uncomfortable" corresponds to No in step S340, in which case the procedure proceeds to step S360.

In step S350, the moderation operation control unit 21 performs a first blowing temperature moderation control, and ends the series of processes. Blowing temperature moderation control is control for moderating the current blowing temperature: control for lowering the blowing temperature when the operation mode of the heat exchange ventilator 100 is heating operation, and control for raising the blowing temperature when the operation mode of the heat exchange ventilator 100 is cooling operation.

In the first blowing temperature moderation control, the moderation operation control unit 21 transmits, to actuators, a control signal for moderating the supply air temperature T_sa, for example, by setting the output of the blower unit 17 to strong air operation, setting the output of the temperature adjustment coil 5 to 25%, or closing the damper 13 to perform the bypass ventilation. In this manner, the moderation operation control unit 21 controls at least one of the blower unit 17, the temperature adjustment coil 5, and the damper 13 to moderate the supply air temperature T_sa. The control signal is a signal for changing the output of each actuator that is used for ventilation operation, namely the blower unit 17, the temperature adjustment coil 5, and the damper 13.

Here, by increasing the output of the temperature adjustment coil 5, the amount of heating or cooling in the temperature adjustment coil 5 is increased. In addition, by reducing the output of the temperature adjustment coil 5, the amount of heating or cooling in the temperature adjustment coil 5 is reduced. In order to moderate the supply air temperature T_sa in the blowing temperature moderation operation, during the heating operation of the temperature adjustment coil 5, control is performed to make the amount of heating in the temperature adjustment coil 5 smaller than immediately before performing the blowing temperature moderation control, and during the cooling operation of the temperature adjustment coil 5, control is performed to make the amount of cooling in the temperature adjustment coil 5 smaller than immediately before performing the blowing temperature moderation control.

In addition, in order to moderate the supply air temperature T_sa in the blowing temperature moderation operation, control is performed on the blower unit 17 to make the air volume of the blower unit 17 larger than or smaller than immediately before performing the blowing temperature moderation control. In addition, in order to moderate the supply air temperature T_sa in the blowing temperature moderation operation, control is performed on the damper 13 to move the damper 13 to a position suitable for moderating the supply air temperature T_sa: either the position where the bypass exhaust air passage 1d is open or the position where the bypass exhaust air passage 1d is closed.

Note that if there is no control in the first blowing temperature moderation control, for example, that can make the output of the temperature adjustment coil 5, the output of the blower unit 17, and/or the operation of the damper 13 achieve a greater effect of blowing temperature moderation than the current control independent of the first blowing temperature moderation control, then the output of each actuator will not be changed.

In step S360, the moderation operation control unit 21 performs a third blowing temperature moderation control, and ends the series of processes. The third blowing temperature moderation control is control for switching the temperature adjustment coil 5 to thermo-off. In this case, the damper 13 may be closed for the bypass ventilation and the operation of the blower unit 17 may be continued, or the output of the blower unit 17 may be stopped. In the third blowing temperature moderation control, among the output of the temperature adjustment coil 5, the output of the blower unit 17, and the operation of the damper 13, the most effective one for moderating the blowing temperature can be selected and controlled as an implementable blowing temperature moderation control.

In step S370, it is determined whether the supply air temperature T_sa is higher than or equal to "upper limit blowing temperature Tlim_HI-ΔT2". Determining in step S370 that the supply air temperature T_sa is higher than or equal to "upper limit blowing temperature Tlim_HI-ΔT2" corresponds to Yes in step S370, in which case the procedure proceeds to step S380.

ΔT2 is a second correction value for dividing the temperature region between the upper limit blowing temperature Tlim_HI and the lower limit blowing temperature Tlim_LO with respect to the upper limit blowing temperature Tlim_HI or the lower limit blowing temperature Tlim_LO in order to determine which of a plurality of blowing temperature moderation controls implementable by the moderation operation control unit 21 is to be performed when the moderation operation control unit 21 performs the blowing temperature moderation operation.

The magnitude relationship between ΔT1 in step S330 and ΔT2 in step S370 is expressed by Formula (1) below, indicating that ΔT2 is larger than ΔT1. Accordingly, "upper limit blowing temperature Tlim_HI-ΔT1">" upper limit blowing temperature Tlim_HI-ΔT2" holds. ΔT1 and ΔT2 can be changed to any numerical values.

[Formula 1]

$$\Delta T1 < \Delta T2 \tag{1}$$

Determining in step S370 that the supply air temperature T_sa is lower than "upper limit blowing temperature Tlim_HI-ΔT2" corresponds to No in step S370, in which case the moderation operation control unit 21 does not perform blowing temperature moderation control for moderating the current blowing temperature, and ends the series of processes.

In step S380, the moderation operation control unit 21 performs a second blowing temperature moderation control, and ends the series of processes. In the second blowing temperature moderation control, the moderation operation control unit 21 transmits, to actuators, a control signal for moderating the supply air temperature T_sa, for example, by setting the output of the blower unit 17 to moderate air operation, setting the output of the temperature adjustment coil 5 to 50%, or closing the damper 13 to perform the bypass ventilation. In this manner, the moderation operation control unit 21 controls at least one of the blower unit 17, the temperature adjustment coil 5, and the damper 13 to moderate the supply air temperature T_sa.

Note that as in the case of the first blowing temperature moderation control, if there is no control in the second blowing temperature moderation control, for example, that can make the output of the temperature adjustment coil 5, the output of the blower unit 17, and/or the operation of the damper 13 achieve a greater effect of blowing temperature moderation than the current control independent of the second blowing temperature moderation control, then the output of each actuator will not be changed.

As described above, the blowing temperature moderation control according to the first embodiment is characterized in that the temperature region is divided using ΔT1 and ΔT2 with respect to the upper limit blowing temperature Tlim_HI or the lower limit blowing temperature Tlim_LO so as to sense which temperature region the supply air temperature T_sa is in, thereby performing control to moderate the blowing temperature stepwise.

Therefore, the magnitude relationship between the effect of blowing temperature moderation by the first blowing temperature moderation control, the effect of blowing temperature moderation by the second blowing temperature moderation control, and the effect of blowing temperature moderation by the third blowing temperature moderation control is "effect of third blowing temperature moderation control>effect of first blowing temperature moderation control>effect of second blowing temperature moderation control" in descending order of moderation effect.

However, this magnitude relationship is a relationship that applies to the case where there are only three patterns of blowing temperature moderation control. For example, control may be performed such that after it is determined in step S370 that the supply air temperature T_sa is lower than "upper limit blowing temperature Tlim_HI-ΔT2" ("No" in step S370), it is further determined whether the supply air temperature T_sa is higher than or equal to "upper limit blowing temperature Tlim_HI-ΔT3". In this case, in response to determining that the supply air temperature T_sa is higher than or equal to "upper limit blowing temperature Tlim_HI-ΔT3", a fourth blowing temperature moderation control for moderating the supply air temperature T_sa can be performed.

This fourth blowing temperature moderation control can be added to the procedure illustrated in FIG. 6 so that four patterns of blowing temperature moderation control are prepared. In this case, the magnitude relationship is "effect of third blowing temperature moderation control>effect of first blowing temperature moderation control>effect of second blowing temperature moderation control>effect of fourth blowing temperature moderation control" in descending order of moderation effect.

In addition, the number of patterns of blowing temperature moderation control can be further increased to five or six, and similar blowing temperature moderation control can be performed; therefore, blowing temperature moderation control can be performed in any number of stages.

In the blowing temperature moderation control of three patterns, the simplest method for determining the blowing temperature moderation control is, for example, to treat the output of the blower unit 17 and the output of the temperature adjustment coil 5 as numerical values as follows.

Output of the blower unit 17=strong: "3", output of the blower unit 17=moderate: "2", output of the blower unit 17=weak: "1"

Output of the temperature adjustment coil 5=0%: "3", output of the temperature adjustment coil 5=25%: "2", output of the temperature adjustment coil 5=50%: "1", output of the temperature adjustment coil 5=100%: "0"

In this case, by setting the blowing temperature moderation control as follows, the blowing temperature moderation control can be performed without being affected by actuator control that is based on control independent of the blowing temperature moderation control according to the first embodiment.

Third blowing temperature moderation control: output of the blower unit 17=3, output of the temperature adjustment coil 5=3, operation of the damper 13=open First blowing temperature moderation control: output of the blower unit 17=2, output of the temperature adjustment coil 5=2, operation of the damper 13=closed Second blowing temperature moderation control: output of the blower unit 17=1, output of the temperature adjustment coil 5=1, operation of the damper 13=closed Alternatively, by setting the blowing temperature moderation control as follows, the blowing temperature moderation control can be performed without being affected by actuator control that is based on control independent of the blowing temperature moderation control according to the first embodiment.

Third blowing temperature moderation control: output of the blower unit 17=strong, output of the temperature adjustment coil 5=0%, operation of the damper 13=open First blowing temperature moderation control: output of the blower unit 17=current value+1, output of the temperature adjustment coil 5=current value+1, operation of the damper 13=closed Second blowing temperature moderation control: output of the blower unit 17=current value+1, output of the temperature adjustment coil 5=current value+1, operation of the damper 13=closed In the above-described blowing temperature moderation control, the reason why the damper 13 is open in some cases, that is, the total heat exchange ventilation operation is performed, is to avoid making the blowing temperature rather uncomfortable by the introduction of outdoor air in the bypass ventilation operation, which is started by closing the damper 13. In the open state of the damper 13, the damper 13 is at the position where the bypass exhaust air passage 1d is closed so that the total heat exchange ventilation is performed. In the closed state of the damper 13, the damper 13 is at the position where the bypass exhaust air passage 1d is open so that the bypass ventilation is performed.

Note that the blowing temperature moderation based on the output of the blower unit 17, the output of the temperature adjustment coil 5, and/or the operation of the damper 13 may be performed using all the actuators or only one or more of the actuators, e.g. the temperature adjustment coil 5.

Further, the supply air temperature T_sa may be confirmed after the output of the temperature adjustment coil 5 is changed, and then it may be determined whether to change the output of the blower unit 17 and the operation of the damper 13. In this case, the order of priority of the actuator output change and the operation change can be freely determined.

In step S390, the moderation operation control unit 21 determines whether the current operation mode of the temperature adjustment coil 5 is cooling operation. Determining in step S390 that the operation mode is cooling operation corresponds to Yes in step S390, in which case the procedure proceeds to step S400. Determining in step S390 that the operation mode is not cooling operation corresponds to No in step S390, in which case the procedure returns to step S310.

In step S400, the moderation operation control unit 21 determines whether the supply air temperature T_sa is lower than or equal to "lower limit blowing temperature Tlim_LO+ΔT1". Determining in step S400 that the supply air temperature T_sa is lower than or equal to "lower limit blowing temperature Tlim_LO+ΔT1" corresponds to Yes in step S400, in which case the procedure proceeds to step S340. Determining in step S400 that the supply air temperature T_sa is higher than "lower limit blowing temperature Tlim_LO+ΔT1" corresponds to No in step S400, in which case the procedure proceeds to step S410.

In step S410, the moderation operation control unit 21 determines whether the supply air temperature T_sa is lower than or equal to "lower limit blowing temperature Tlim_LO+ΔT2". Determining in step S410 that the supply air temperature T_sa is lower than or equal to "lower limit blowing temperature Tlim_LO+ΔT2" corresponds to Yes in step S410, in which case the procedure proceeds to step S420.

Determining in step S410 that the supply air temperature T_sa is higher than "lower limit blowing temperature Tlim_LO+ΔT2" corresponds to "No" in step S410, in which case the moderation operation control unit 21 does not perform blowing temperature moderation control for moderating the current blowing temperature, and ends the series of processes.

In step S420, the moderation operation control unit 21 performs the second blowing temperature moderation control as in step S380 described above, and ends the series of processes.

When the moderation operation control unit 21 performs the first blowing temperature moderation control, the second blowing temperature moderation control, and the third blowing temperature moderation control described above, the moderation operation control unit 21 may calculate the dew point of the air environment in the room based on the indoor temperature and the indoor humidity measured by an indoor temperature/humidity measurement unit 12 (described later), and control the operation of at least one of the blower unit 17, the temperature adjustment coil 5, and the damper 13 such that the supply air temperature of the supply air blown out from the casing 1a, namely the blowing temperature of the supply air, does not fall to or below the dew point of the indoor air. Accordingly, it is possible to prevent dew condensation in the casing 1a due to the blowing temperature of the supply air.

By performing the above processes, it is sensed which of the temperature sections defined by ΔT1 and ΔT2 in the temperature range from the lower limit blowing temperature Tlim_LO to the upper limit blowing temperature Tlim_HI the current supply air temperature T_sa is in, whereby it is possible to moderate the blowing temperature stepwise using the blowing temperature moderation control that can be freely set. As a result, it is possible to control the operation of the heat exchange ventilator 100 such that the blowing temperature of the supply air blown out from the casing 1a does not fail to satisfy the upper limit blowing temperature Tlim_HI and the lower limit blowing temperature Tlim_LO, and it is possible to improve the comfort of the blowing temperature of the supply air blown out from the casing 1a.

As described above, the heat exchange ventilator 100 according to the first embodiment performs control based on the measured value of the blowing temperature of the supply air such that the measured value of the blowing temperature of the supply air is within the temperature range from the lower limit blowing temperature Tlim_LO to the upper limit blowing temperature Tlim_HI, which is the range of blowing temperatures with which the user feels comfortable. That is, the heat exchange ventilator 100 can perform ventilation operation by controlling the blowing temperature of the supply air within the temperature range from the lower limit blowing temperature Tlim_LO to the upper limit blowing temperature Tlim_HI so that the blowing temperature of the supply air does not make the user in the room equipped with the heat exchange ventilator 100 uncomfortable.

In addition, during the heating operation of the temperature adjustment coil 5, the moderation operation control unit 21 compares the upper limit blowing temperature Tlim_HI with the supply air temperature T_sa, and makes the amount of heating in the temperature adjustment coil 5 smaller as the supply air temperature T_sa is closer to the upper limit blowing temperature Tlim_HI, and during the cooling operation of the temperature adjustment coil 5, compares the lower limit blowing temperature Tlim_LO with the supply air temperature T_sa, and makes the amount of cooling in the temperature adjustment coil 5 smaller as the supply air temperature T_sa is closer to the lower limit blowing temperature Tlim_LO. As a result, the supply air temperature T_sa can be moderated stepwise, and the supply air temperature T_sa can be finely moderated.

In addition, the heat exchange ventilator 100 can prevent excessive cooling of the supply air and excessive heating of the supply air that are uncomfortable for the user in the room; therefore, energy-saving ventilation operation can be achieved.

Thus, the heat exchange ventilator 100 according to the first embodiment can achieve the effect of performing ventilation in which supply air comfortable for the user in the room is supplied into the room.

Second Embodiment

Figure 7:
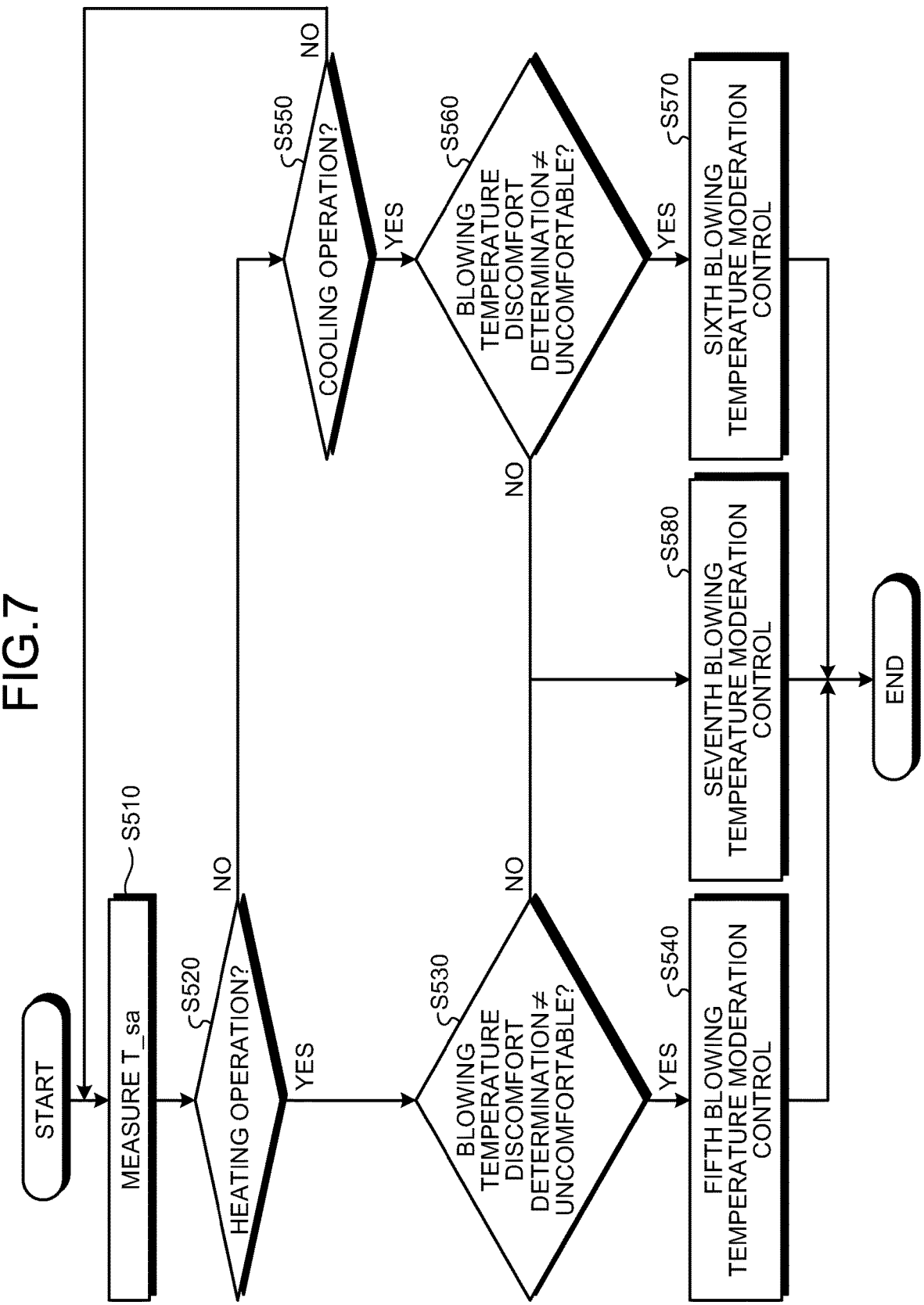
FIG. 7 is a flowchart illustrating a procedure for the blowing temperature moderation operation of a heat exchange ventilator according to a second embodiment of the present invention.

FIG. 7 is a flowchart illustrating a procedure for the blowing temperature moderation operation of the heat exchange ventilator 100 according to a second embodiment of the present invention. In the second embodiment, the method for determining the blowing temperature moderation control is expressed in formulas using actuator output, so that the blowing temperature moderation control can be performed more linearly than in the first embodiment described above.

First, in step S510, the supply air temperature/humidity measurement unit 16 measures the supply air temperature T_sa at predetermined measurement intervals. The supply air temperature/humidity measurement unit 16 transmits information on the measured supply air temperature T_sa to the moderation operation control unit 21. After step S510, the procedure proceeds to step S520.

In step S520, the moderation operation control unit 21 determines whether the current operation mode of the temperature adjustment coil 5 is heating operation. Determining in step S520 that the operation mode is heating operation corresponds to Yes in step S520, in which case the procedure proceeds to step S530. Determining in step S520 that the operation mode is not heating operation corresponds to No in step S520, in which case the procedure proceeds to step S550.

In step S530, the blowing temperature discomfort determination is performed according to the procedures illustrated in the flowcharts of FIGS. 4 and 5, and it is determined whether the result of the blowing temperature discomfort determination indicates "not uncomfortable". The result of the blowing temperature discomfort determination indicating "not uncomfortable" corresponds to Yes in step S530, in which case the procedure proceeds to step S540. The result of the blowing temperature discomfort determination indicating "uncomfortable" corresponds to No in step S530, in which case the procedure proceeds to step S580.

In step S540, the moderation operation control unit 21 performs a fifth blowing temperature moderation control, and ends the series of processes. An actuator output OutPut5, which is the actuator output in the fifth blowing temperature moderation control, is calculated with Formula (2) below using the supply air temperature T_sa and the upper limit blowing temperature Tlim_HI.

[Formula 2]

$$OutPut5 = \frac{T\_sa}{Tlim\_HI} \times 100[\%] \quad (2)$$

The actuator output OutPut5 calculated with Formula (2) may be reflected in either the output of the blower unit 17 or the output of the temperature adjustment coil 5, or may be reflected in both of them. The operation of the damper 13, which consists of two patterns, opening and closing, may be freely combined with the output of each actuator as in the case of the first embodiment described above.

In step S580, the moderation operation control unit 21 performs a seventh blowing temperature moderation control, and ends the series of processes. The seventh blowing temperature moderation control is control for switching the temperature adjustment coil 5 to thermo-off. In this case, the damper 13 may be closed and the operation of the blower unit 17 may be continued, or the output of the blower unit 17 may be stopped. In the seventh blowing temperature moderation control, among the output of the temperature adjustment coil 5, the output of the blower unit 17, and the operation of the damper 13, the most effective one for moderating the blowing temperature can be selected and controlled as an implementable blowing temperature moderation control. The seventh blowing temperature moderation control may be considered to be the same as the third blowing temperature moderation control in the first embodiment described above.

In step S550, the moderation operation control unit 21 determines whether the current operation mode of the temperature adjustment coil 5 is cooling operation. Determining in step S550 that the operation mode is cooling operation corresponds to Yes in step S550, in which case the procedure proceeds to step S560. Determining in step S550 that the operation mode is not cooling operation corresponds to No in step S550, in which case the procedure returns to step S510.

In step S560, the blowing temperature discomfort determination is performed according to the procedures illustrated in the flowcharts of FIGS. 4 and 5, and it is determined whether the result of the blowing temperature discomfort determination indicates "not uncomfortable". The result of the blowing temperature discomfort determination indicating "not uncomfortable" corresponds to Yes in step S560, in which case the procedure proceeds to step S570. The result of the blowing temperature discomfort determination indicating "uncomfortable" corresponds to No in step S560, in which case the procedure proceeds to step S580.

In step S570, a sixth blowing temperature moderation control is performed, and the series of processes ends. An actuator output OutPut6, which is the actuator output in the sixth blowing temperature moderation control, is calculated with Formula (3) below using the supply air temperature T_sa and the lower limit blowing temperature Tlim_LO.

[Formula 3]

$$OutPut6 = \frac{Tlim\_LO}{T\_sa} \times 100[\%] \quad (3)$$

The actuator output OutPut6 calculated with Formula (3) may be reflected in either the output of the blower unit 17 or the output of the temperature adjustment coil 5, or may be reflected in both of them. The operation of the damper 13, which consists of two patterns, opening and closing, may be freely combined with the output of each actuator as in the case of the first embodiment described above.

By performing the above-described control, the moderation operation control unit 21 can control the amount of heating or cooling in the temperature adjustment coil 5 in a plurality of stages based on the ratio of the supply air temperature T_sa to the upper limit blowing temperature Tlim_HI or the lower limit blowing temperature Tlim_LO, thereby moderating the supply air temperature T_sa stepwise and moderating the supply air temperature T_sa finely.

As described above, the second embodiment can achieve a similar effect to the first embodiment because the blowing temperature moderation operation is performed in a similar manner to the first embodiment.

The second embodiment differs from the first embodiment in that the amount of control for use in controlling each actuator in the blowing temperature moderation control is determined by the relative ratio [%] of the supply air temperature T_sa to the upper limit blowing temperature Tlim_HI in the case of heating operation. In the case of cooling operation, the amount of control for use in controlling each actuator in the blowing temperature moderation control is determined by the relative ratio [%] of the lower limit blowing temperature Tlim_LO to the supply air temperature T_sa. Thus, unlike the first embodiment, the second embodiment can achieve the effect of moderating the blowing temperature of the supply air without the need to determine ΔT1 and ΔT2 in advance for partitioning.

Third Embodiment

Figure 8:
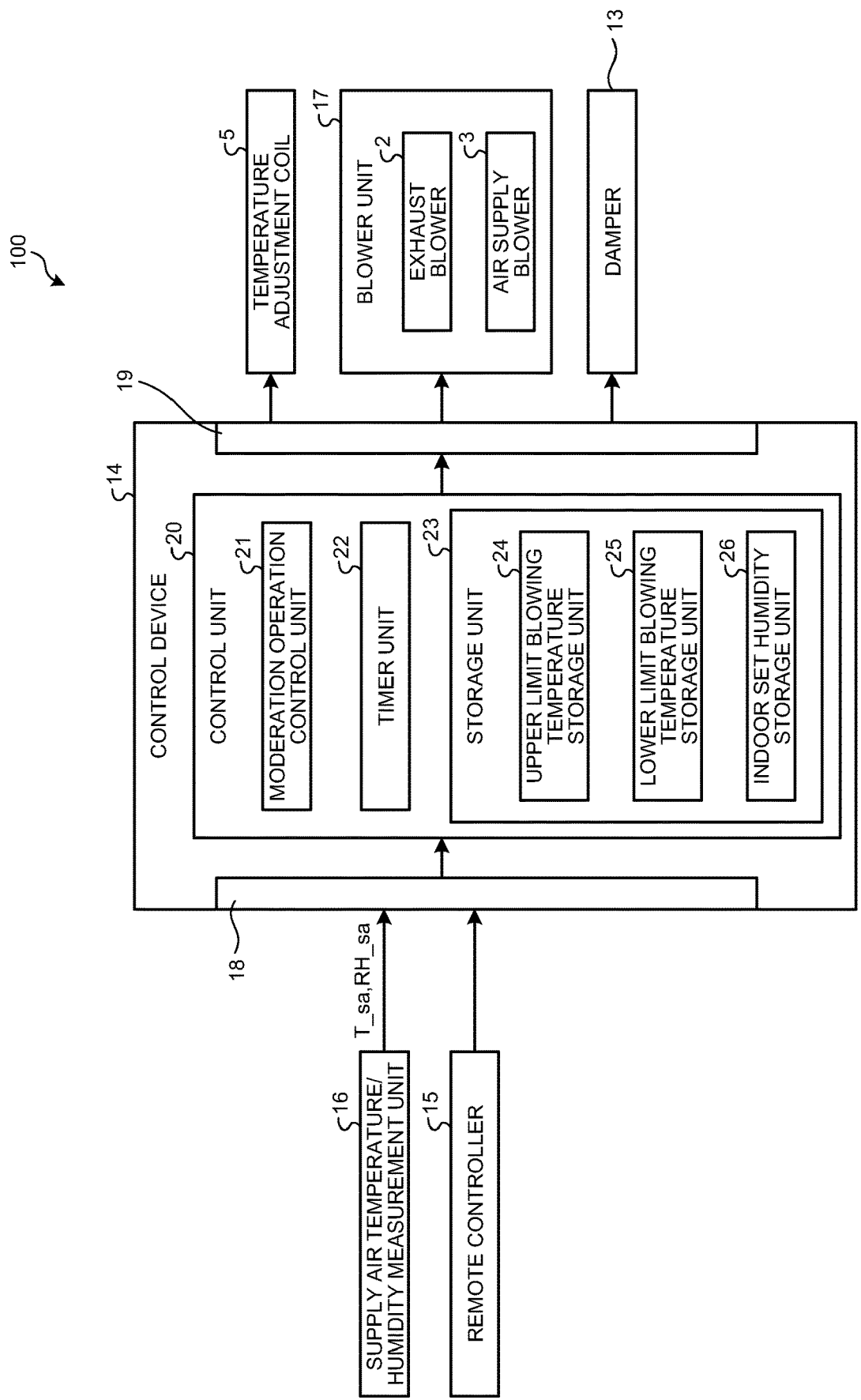
FIG. 8 is a diagram illustrating a functional configuration related to the operation of a heat exchange ventilator according to a third embodiment of the present invention.

FIG. 8 is a diagram illustrating a functional configuration related to the operation of the heat exchange ventilator 100 according to a third embodiment of the present invention. In the blowing temperature moderation operation according to the third embodiment, the control unit 20 stores an indoor set humidity, and determines whether to enable the blowing temperature moderation operation based on the humidity of the supply air before performing the blowing temperature moderation operation described in the first or second embodiment.

The indoor set humidity is a target value set for the humidity of the indoor air, which is sent from the remote controller 15 to the control unit 20 via the input interface 18, and is set and stored in an indoor set humidity storage unit 26 of the storage unit 23 under the control of the control unit 20. The indoor set humidity can be set as an indoor set relative humidity RH_set, i.e. set humidity expressed as relative humidity, or an indoor set absolute humidity AH_set, i.e. set humidity expressed as absolute humidity. The indoor set humidity can be changed to any value using the remote controller 15 via the input interface 18. In a case where another control of the heat exchange ventilator 100 independent of the blowing temperature moderation operation according to the third embodiment uses an indoor set humidity, the indoor set humidity set in that control may be applied here.

The supply air temperature T_sa and a supply air relative humidity RH_sa measured by the supply air temperature/humidity measurement unit 16 and information input from the remote controller 15 are sent to the moderation operation control unit 21 via the input interface 18. A control signal transmitted from the moderation operation control unit 21 is transmitted to the blower unit 17, the temperature adjustment coil 5, and the damper 13 via the output interface 19. The blower unit 17, the temperature adjustment coil 5, and the damper 13 change the output of the blower unit 17, the output of the temperature adjustment coil 5, or the opening/closing operation of the damper 13 according to the received control signal.

Figure 9:
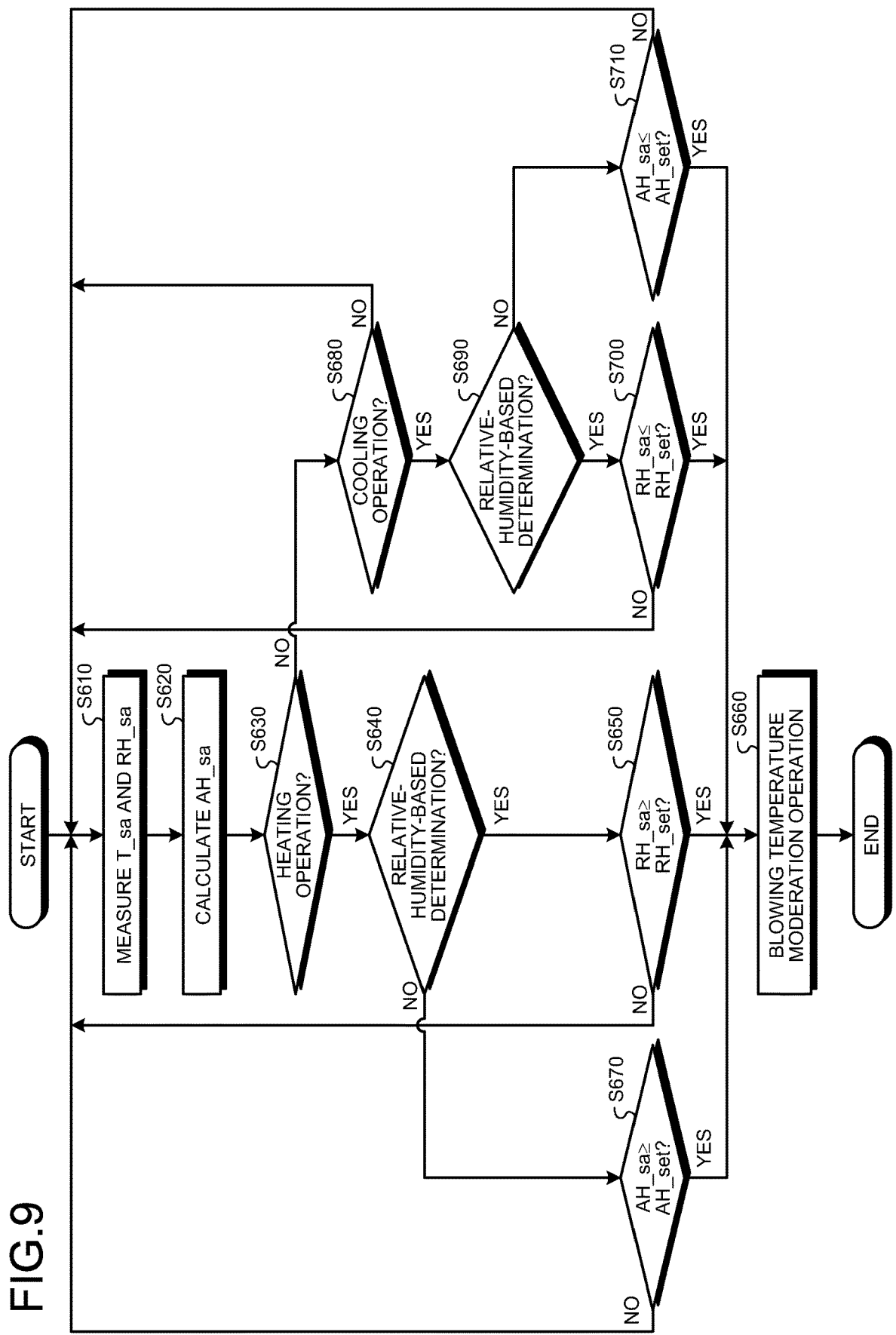
FIG. 9 is a flowchart illustrating a procedure for the blowing temperature moderation operation of the heat exchange ventilator according to the third embodiment of the present invention.

FIG. 9 is a flowchart illustrating a procedure for the blowing temperature moderation operation of the heat exchange ventilator 100 according to the third embodiment of the present invention. In the control of the blowing temperature moderation operation of the heat exchange ventilator 100 according to the third embodiment described below, the blowing temperature moderation operation is performed based on the result of determining whether to enable the blowing temperature moderation operation based on the humidity of the supply air. The blowing temperature moderation control in the blowing temperature moderation operation is the same as that of either the first embodiment or the second embodiment described above.

First, in step S610, the supply air temperature/humidity measurement unit 16 measures the supply air temperature T_sa and the supply air relative humidity RH_sa, which is the relative humidity of the supply air, at predetermined measurement intervals. The supply air temperature/humidity measurement unit 16 transmits information on the measured supply air temperature T_sa and information on the measured supply air relative humidity RH_sa to the moderation operation control unit 21. In a case where another control of the heat exchange ventilator 100 independent of the blowing temperature moderation operation according to the third embodiment uses the supply air temperature T_sa and the supply air relative humidity RH_sa, the supply air temperature T_sa and the supply air relative humidity RH_sa used in that control may be applied here. After step S610, the procedure proceeds to step S620.

In step S620, the moderation operation control unit 21 calculates a supply air absolute humidity AH_sa, which is the absolute humidity of the supply air, from the supply air temperature T_sa and the supply air relative humidity RH_sa. After step S620, the procedure proceeds to step S630. Note that if the supply air temperature/humidity measurement unit 16 is capable of directly measuring the absolute humidity, step S620 may be skipped.

The supply air absolute humidity AH_sa is calculated with Formula (4) below.

[Formula 4]

$$\mathrm{AH\_sa} = \alpha \times \frac{\mathrm{RH\_sa}}{100} [\mathrm{g/m^3}] \quad (4)$$

In Formula (4), a is expressed by Formula (5) below.

[Formula 5]

$$\alpha = \frac{217 \times 6.1078 \times 10^{\frac{7.5 \times T\_sa}{T\_sa+237.3}}}{T\_sa + 273.15} [\mathrm{g/m^3}] \quad (5)$$

In step S630, the moderation operation control unit 21 determines whether the current operation mode of the temperature adjustment coil 5 is heating operation. Determining in step S630 that the operation mode is heating operation corresponds to Yes in step S630, in which case the procedure proceeds to step S640. Determining in step S630 that the operation mode is not heating operation corresponds to No in step S630, in which case the procedure proceeds to step S680.

In step S640, the moderation operation control unit 21 determines whether to perform the relative-humidity-based determination of determining whether to enable the blowing temperature moderation operation using the supply air relative humidity RH_sa. Determining in step S640 to perform the relative-humidity-based determination corresponds to Yes in step S640, in which case the procedure proceeds to step S650. Determining in step S640 not to perform the relative-humidity-based determination corresponds to No in step S640, in which case the procedure proceeds to step S670.

Determination information for determining whether the moderation operation control unit 21 performs the relative-humidity-based determination of determining whether to enable the blowing temperature moderation operation using the supply air relative humidity RH_sa or the absolute-humidity-based determination of determining whether to enable the blowing temperature moderation operation using the supply air absolute humidity AH_sa is sent from the remote controller 15 to the moderation operation control unit 21 via the input interface 18, and is set and stored in the moderation operation control unit 21. The determination information can be freely changed using the remote controller 15 via the input interface 18.

In step S650, the moderation operation control unit 21 determines whether the supply air relative humidity RH_sa is higher than or equal to the indoor set relative humidity RH_set, which is the indoor set humidity. Determining in step S650 that the supply air relative humidity RH_sa is higher than or equal to the indoor set relative humidity RH_set corresponds to Yes in step S650, in which case the procedure proceeds to step S660. Determining in step S650 that the supply air relative humidity RH_sa is lower than the indoor set relative humidity RH_set corresponds to No in step S650, in which case the procedure returns to step S610.

In step S660, the heat exchange ventilator 100 shifts to the blowing temperature moderation operation. That is, the moderation operation control unit 21 starts to control the blowing temperature moderation operation. The blowing temperature moderation operation and the blowing temperature moderation control are the same as those in the first or second embodiment described above; therefore, the procedure proceeds to step S310 in FIG. 6 or step S510 in FIG. 7.

In step S670, the moderation operation control unit 21 determines whether the supply air absolute humidity AH_sa is higher than or equal to the indoor set absolute humidity AH_set, which is the indoor set humidity. Determining in step S670 that the supply air absolute humidity AH_sa is higher than or equal to the indoor set absolute humidity AH_set corresponds to Yes in step S670, in which case the procedure proceeds to step S660. Determining in step S670 that the supply air absolute humidity AH_sa is lower than the indoor set absolute humidity AH_set corresponds to No in step S670, in which case the procedure returns to step S610.

The indoor set humidity used in steps S650 and S670 when the current operation mode of the temperature adjustment coil 5 is heating operation is a first indoor set humidity.

In step S680, the moderation operation control unit 21 determines whether the current operation mode of the temperature adjustment coil 5 is cooling operation. Determining in step S680 that the operation mode is cooling operation corresponds to Yes in step S680, in which case the procedure proceeds to step S690. Determining in step S680 that the operation mode is not cooling operation corresponds to No in step S680, in which case the procedure returns to step S610.

In step S690, the moderation operation control unit 21 determines whether to perform the relative-humidity-based determination of determining whether to enable the blowing temperature moderation operation with the supply air relative humidity RH_sa. Determining in step S690 to perform the relative-humidity-based determination corresponds to Yes in step S690, in which case the procedure proceeds to step S700. Determining in step S690 not to perform the relative-humidity-based determination corresponds to No in step S690, in which case the procedure proceeds to step S710.

In step S700, the moderation operation control unit 21 determines whether the supply air relative humidity RH_sa is lower than or equal to the indoor set relative humidity RH_set, which is the indoor set humidity. Determining in step S700 that the supply air relative humidity RH_sa is lower than or equal to the indoor set relative humidity RH_set corresponds to Yes in step S700, in which case the procedure proceeds to step S660. Determining in step S700 that the supply air relative humidity RH_sa is higher than the indoor set relative humidity RH_set corresponds to No in step S700, in which case the procedure returns to step S610.

Note that the indoor set relative humidity RH_set in step S700 may be a value different from the indoor set relative humidity RH_set in step S650.

In step S710, the moderation operation control unit 21 determines whether the supply air absolute humidity AH_sa is lower than or equal to the indoor set absolute humidity AH_set, which is the indoor set humidity. Determining in step S710 that the supply air absolute humidity AH_sa is lower than or equal to the indoor set absolute humidity AH_set corresponds to Yes in step S710, in which case the procedure proceeds to step S660.

Determining in step S710 that the supply air absolute humidity AH_sa is higher than the indoor set absolute humidity AH_set corresponds to No in step S710, in which case the procedure returns to step S610.

The indoor set humidity used in steps S700 and S710 when the current operation mode of the temperature adjustment coil 5 is cooling operation is a second indoor set humidity. Note that the indoor set absolute humidity AH_set in step S710 may be a value different from the indoor set absolute humidity AH_set in step S670.

As described above, in the third embodiment, whether to enable the blowing temperature moderation operation is determined by comparing the indoor set relative humidity RH_set, which is the indoor set humidity, with the supply air relative humidity RH_sa, or by comparing the indoor set absolute humidity AH_set, which is the indoor set humidity, with the supply air absolute humidity AH_sa.

By performing such a process, the moderation operation control unit 21 can perform control such that the blowing temperature moderation operation is performed only when the supply air humidity, which is the humidity of the supply air that has passed through the temperature adjustment coil 5, is higher than or equal to the indoor set humidity during the heating operation of the heat exchange ventilator 100. This enables the heat exchange ventilator 100 to moderate the blowing temperature of the supply air only when the indoor humidity is in a favorable state so that the room can be kept comfortable; therefore, the humidity environment of the indoor air does not become uncomfortable due to the moderation of the blowing temperature of the supply air.

In addition, during the cooling operation of the heat exchange ventilator 100, the moderation operation control unit 21 can perform control such that the blowing temperature moderation operation is performed only when the supply air humidity is lower than or equal to the indoor set humidity. This enables the heat exchange ventilator 100 to moderate the blowing temperature of the supply air only when the indoor humidity is in a favorable state so that the room can be kept comfortable; therefore, the humidity environment of the indoor air does not become uncomfortable due to the moderation of the blowing temperature of the supply air.

Thus, in the third embodiment, it is possible to moderate the blowing temperature of the supply air in consideration of the humidity environment of the indoor air, and to prevent the humidity environment of the indoor air from becoming uncomfortable due to the blowing temperature moderation operation.

Fourth Embodiment

Figure 10:
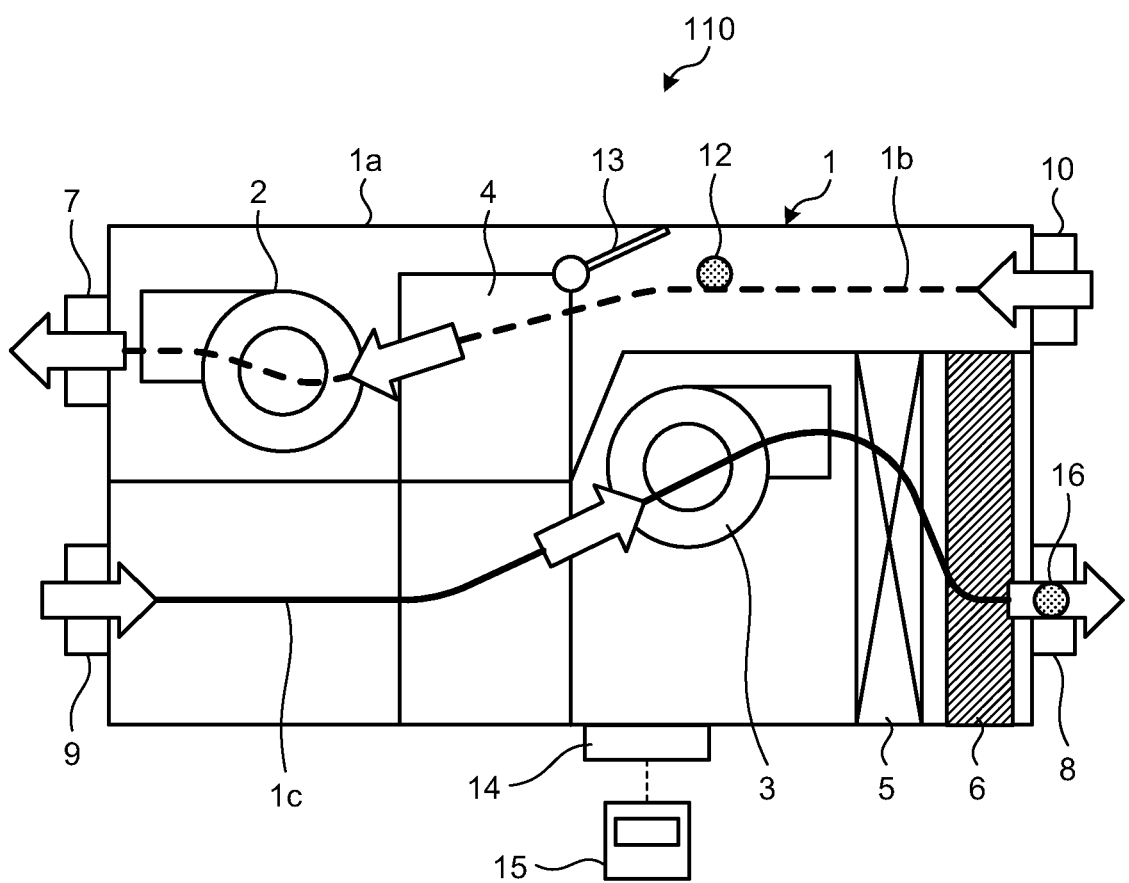
FIG. 10 is a schematic plan view illustrating the internal configuration of a heat exchange ventilator according to a fourth embodiment of the present invention.
Figure 11:
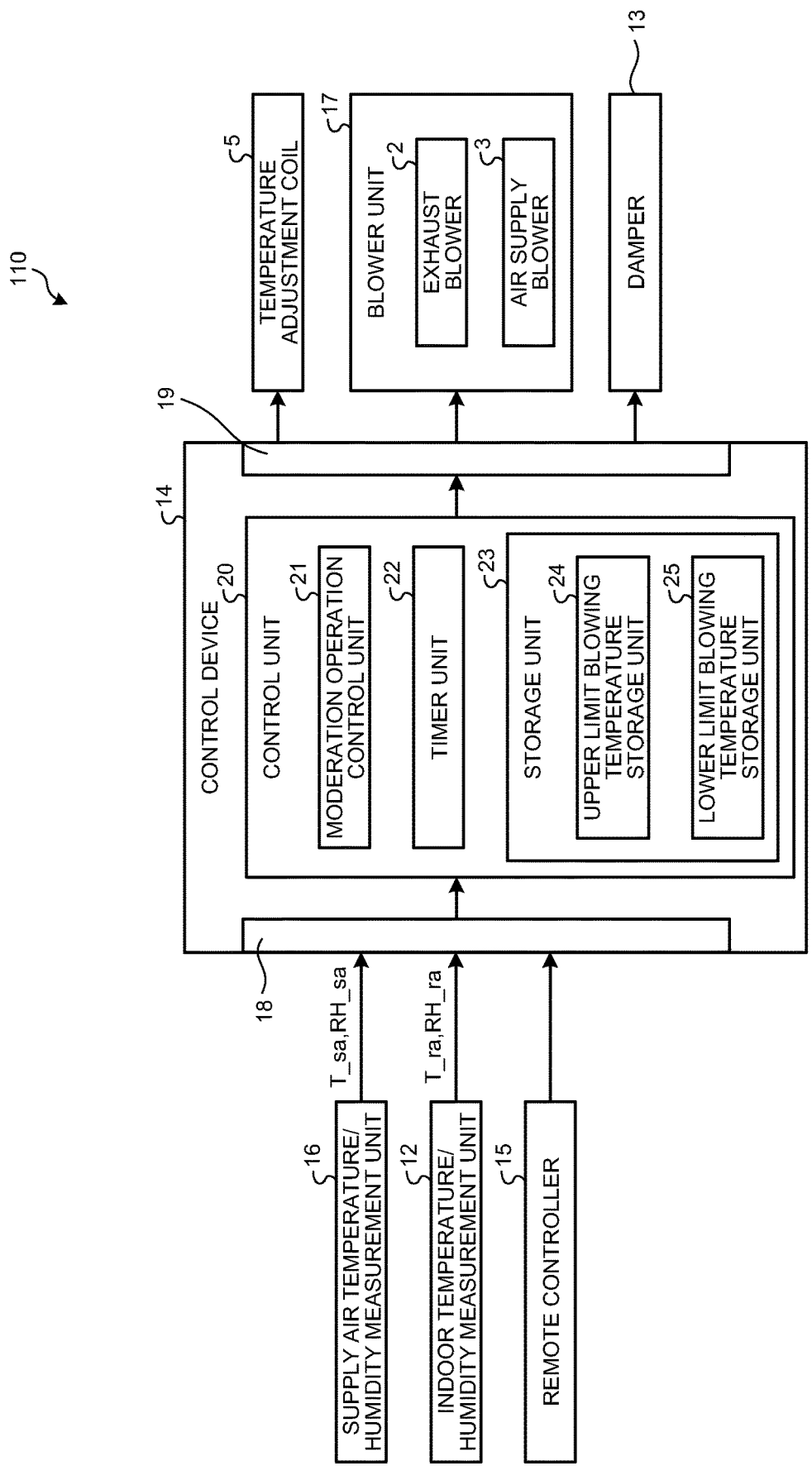
FIG. 11 is a diagram illustrating a functional configuration related to the operation of the heat exchange ventilator according to the fourth embodiment of the present invention.

FIG. 10 is a schematic plan view illustrating the internal configuration of a heat exchange ventilator 110 according to a fourth embodiment of the present invention. FIG. 11 is a diagram illustrating a functional configuration related to the operation of the heat exchange ventilator 110 according to the fourth embodiment of the present invention.

The heat exchange ventilator 110 according to the fourth embodiment includes the indoor temperature/humidity measurement unit 12 capable of measuring the temperature of the indoor air and the humidity of the indoor air, in addition to the components of the heat exchange ventilator 100 according to the first to third embodiments described above. The indoor temperature/humidity measurement unit 12 is provided at a position upstream of the total heat exchanger 4 in the portion shared by the heat exchange exhaust air passage 1b and the bypass exhaust air passage 1d. That is, the indoor temperature/humidity measurement unit 12 is provided at a position upstream of the total heat exchanger 4 in the exhaust air passage.

The supply air temperature T_sa and the supply air relative humidity RH_sa measured by the supply air temperature/humidity measurement unit 16, an indoor temperature T_ra and an indoor relative humidity RH_ra, i.e. the temperature of the indoor air and the humidity of the indoor air measured by the indoor temperature/humidity measurement unit 12, respectively, and information input from the remote controller 15 are sent to the moderation operation control unit 21 via the input interface 18. A control signal transmitted from the moderation operation control unit 21 is transmitted to the blower unit 17, the temperature adjustment coil 5, and the damper 13 via the output interface 19. The blower unit 17, the temperature adjustment coil 5, and the damper 13 change the output of the blower unit 17, the output of the temperature adjustment coil 5, or the opening/closing operation of the damper 13 according to the received control signal.

Figure 12:
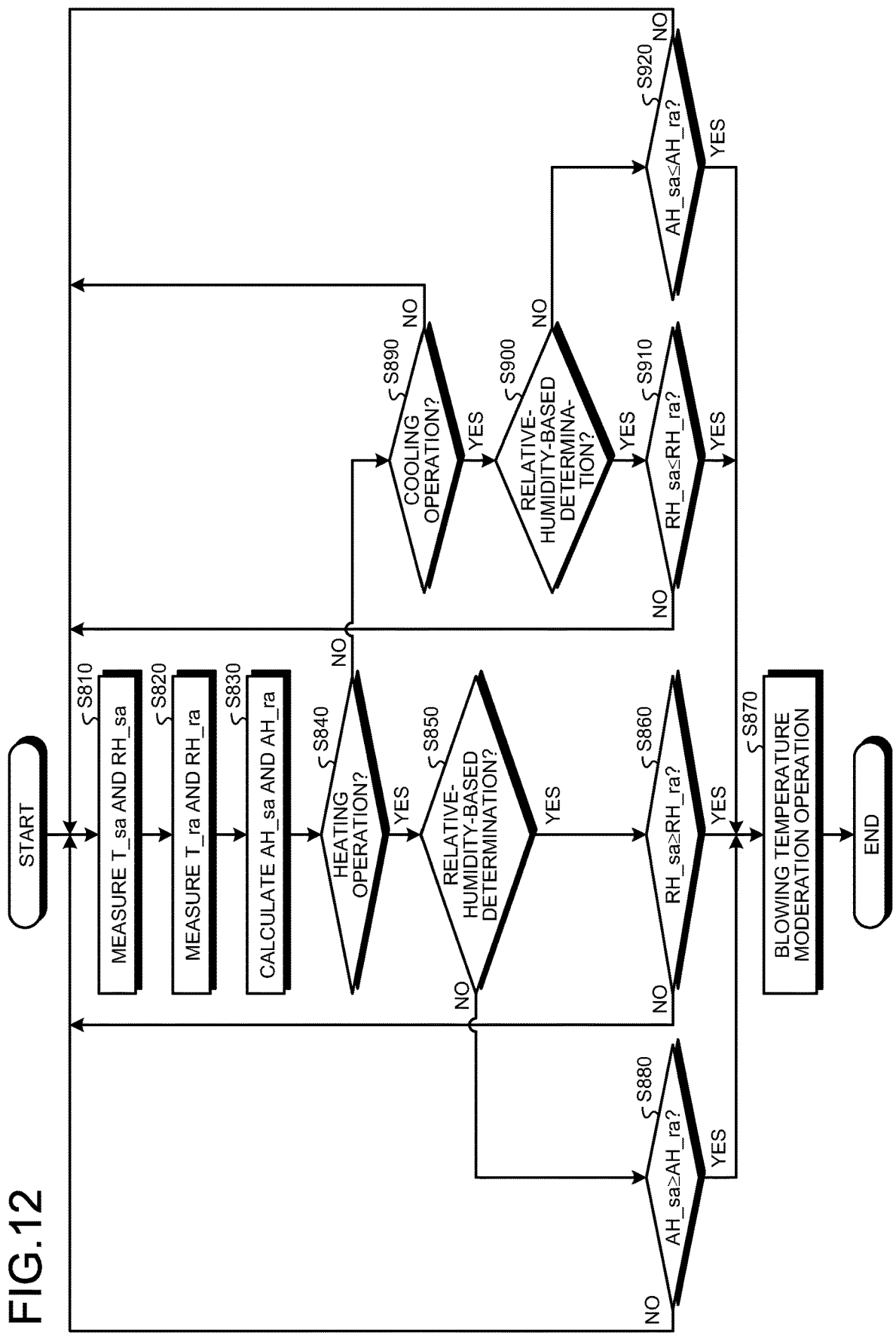
FIG. 12 is a flowchart illustrating a procedure for the blowing temperature moderation operation of the heat exchange ventilator according to the fourth embodiment of the present invention.

FIG. 12 is a flowchart illustrating a procedure for the blowing temperature moderation operation of the heat exchange ventilator 110 according to the fourth embodiment of the present invention. In the fourth embodiment described below, as in the case of the third embodiment described above, the blowing temperature moderation operation is performed based on the result of determining whether to enable the blowing temperature moderation operation based on the humidity. The blowing temperature moderation control in the blowing temperature moderation operation is the same as that of either the first embodiment or the second embodiment described above.

In the third embodiment, the moderation operation control unit 21 compares the indoor set humidity with the supply air humidity to determine whether to enable the blowing temperature moderation operation. In the fourth embodiment, instead of the indoor set humidity, the indoor relative humidity RH_ra or an indoor absolute humidity AH_ra, which is an indoor humidity obtained as the result of a measurement in the indoor temperature/humidity measurement unit 12, is compared with the supply air humidity, whereby it is determined whether to enable the blowing temperature moderation operation.

First, in step S810, the supply air temperature/humidity measurement unit 16 measures the supply air temperature T_sa and the supply air relative humidity RH_sa at predetermined measurement intervals. The supply air temperature/humidity measurement unit 16 transmits information on the measured supply air temperature T_sa and information on the measured supply air relative humidity RH_sa to the moderation operation control unit 21. After step S810, the procedure proceeds to step S820.

In step S820, the indoor temperature/humidity measurement unit 12 measures the indoor temperature T_ra and the indoor relative humidity RH_ra at predetermined measurement intervals. The indoor temperature/humidity measurement unit 12 transmits information on the measured indoor temperature T_ra and information on the measured indoor relative humidity RH_ra to the moderation operation control unit 21. After step S820, the procedure proceeds to step S830.

In step S830, the moderation operation control unit 21 calculates the supply air absolute humidity AH_sa from the supply air temperature T_sa and the supply air relative humidity RH_sa. Note that if the supply air temperature/humidity measurement unit 16 is capable of directly measuring the absolute humidity, the calculation of the supply air absolute humidity AH_sa may be skipped. The moderation operation control unit 21 also calculates the indoor absolute humidity AH_ra from the indoor temperature T_ra and the indoor relative humidity RH_ra. Note that if the indoor temperature/humidity measurement unit 12 is capable of directly measuring the indoor absolute humidity AH_ra, the calculation of the indoor absolute humidity AH_ra may be skipped. After step S830, the procedure proceeds to step S840.

The supply air absolute humidity AH_sa is calculated with Formula (4) above. The indoor absolute humidity AH_ra is calculated with Formula (6) below.

[Formula 6]

$$AH\_ra = \beta \times \frac{RH\_ra}{100} [g/m^3] \qquad (6)$$

In Formula (6), $\beta$ is expressed by Formula (7) below.

[Formula 7]

$$\beta = \frac{217 \times 6.1078 \times 10^{\frac{7.5 \times T\_ra}{T\_ra+237.3}}}{T\_ra + 273.15} [g/m^3] \qquad (7)$$

In step S840, the moderation operation control unit 21 determines whether the current operation mode of the heat exchange ventilator 110 is heating operation. Determining in step S840 that the operation mode is heating operation corresponds to Yes in step S840, in which case the procedure proceeds to step S850. Determining in step S840 that the operation mode is not heating operation corresponds to No in step S840, in which case the procedure proceeds to step S890.

In step S850, the moderation operation control unit 21 determines whether to perform the relative-humidity-based determination of determining whether to enable the blowing temperature moderation operation using the supply air relative humidity RH_sa and the indoor relative humidity RH_ra. Determining in step S850 to perform the relative-humidity-based determination corresponds to Yes in step S850, in which case the procedure proceeds to step S860. Determining in step S850 not to perform the relative-humidity-based determination corresponds to No in step S850, in which case the procedure proceeds to step S880.

In step S860, the moderation operation control unit 21 determines whether the supply air relative humidity RH_sa is higher than or equal to the indoor relative humidity RH_ra. Determining in step S860 that the supply air relative humidity RH_sa is higher than or equal to the indoor relative humidity RH_ra corresponds to Yes in step S860, in which case the procedure proceeds to step S870. Determining in step S860 that the supply air relative humidity RH_sa is lower than the indoor relative humidity RH_ra corresponds to No in step S860, in which case the procedure returns to step S810.

In step S870, the heat exchange ventilator 110 shifts to the blowing temperature moderation operation. That is, the moderation operation control unit 21 starts to control the blowing temperature moderation operation. The blowing temperature moderation operation and the blowing temperature moderation control are the same as those in the first or second embodiment described above; therefore, the procedure proceeds to step S310 in FIG. 6 or step S510 in FIG. 7.

In step S880, the moderation operation control unit 21 determines whether the supply air absolute humidity AH_sa is higher than or equal to the indoor absolute humidity AH_ra. Determining in step S880 that the supply air absolute humidity AH_sa is higher than or equal to the indoor absolute humidity AH_ra corresponds to Yes in step S880, in which case the procedure proceeds to step S870. Determining in step S880 that the supply air absolute humidity AH_sa is lower than the indoor absolute humidity AH_ra corresponds to No in step S880, in which case the procedure returns to step S810.

Determination information for determining whether the moderation operation control unit 21 performs the relative-humidity-based determination or the absolute-humidity-based determination of determining whether to enable the blowing temperature moderation operation using the supply air absolute humidity AH_sa and the indoor absolute humidity AH_ra is sent from the remote controller 15 to the moderation operation control unit 21 via the input interface 18, and is set and stored in the moderation operation control unit 21. The determination information can be freely changed using the remote controller 15 via the input interface 18.

In a case where another control of the heat exchange ventilator 110 independent of the blowing temperature moderation operation according to the fourth embodiment uses results of measurement in the supply air temperature/humidity measurement unit 16 and the indoor temperature/humidity measurement unit 12, the results of measurement used in that control may be applied here.

In step S890, the moderation operation control unit 21 determines whether the current operation mode of the heat exchange ventilator 110 is cooling operation. Determining in step S890 that the operation mode is cooling operation corresponds to Yes in step S890, in which case the procedure proceeds to step S900. Determining in step S890 that the operation mode is not cooling operation corresponds to No in step S890, in which case the procedure returns to step S810.

In step S900, the moderation operation control unit 21 determines whether to perform the relative-humidity-based determination of determining whether to enable the blowing temperature moderation operation using the supply air relative humidity RH_sa and the indoor relative humidity RH_ra. Determining in step S900 to perform the relative-humidity-based determination corresponds to Yes in step S900, in which case the procedure proceeds to step S910. Determining in step S900 not to perform the relative-humidity-based determination corresponds to No in step S900, in which case the procedure proceeds to step S920.

In step S910, the moderation operation control unit 21 determines whether the supply air relative humidity RH_sa is lower than or equal to the indoor relative humidity RH_ra. Determining in step S910 that the supply air relative humidity RH_sa is lower than or equal to the indoor relative humidity RH_ra corresponds to Yes in step S910, in which case the procedure proceeds to step S870. Determining in step S910 that the supply air relative humidity RH_sa is higher than the indoor relative humidity RH_ra corresponds to No in step S910, in which case the procedure returns to step S810.

In step S920, the moderation operation control unit 21 determines whether the supply air absolute humidity AH_sa is lower than or equal to the indoor absolute humidity AH_ra. Determining in step S920 that the supply air absolute humidity AH_sa is lower than or equal to the indoor absolute humidity AH_ra corresponds to Yes in step S920, in which case the procedure proceeds to step S870. Determining in step S920 that the supply air absolute humidity AH_sa is higher than the indoor absolute humidity AH_ra corresponds to No in step S920, in which case the procedure returns to step S810.

As described above, in the fourth embodiment, whether to enable the blowing temperature moderation operation is determined by comparing the indoor relative humidity RH_ra, which is the humidity of the indoor air, with the supply air relative humidity RH_sa, which is the humidity of the supply air blown out from the casing 1a, or by comparing the indoor absolute humidity AH_ra, which is the humidity of the indoor air, with the supply air absolute humidity AH_sa, which is the humidity of the supply air blown out from the casing 1a.

By performing such a process, the moderation operation control unit 21 can perform control such that the blowing temperature moderation operation is performed only when the supply air humidity is higher than or equal to the indoor humidity during the heating operation of the heat exchange ventilator 110. This enables the heat exchange ventilator 110 to moderate the blowing temperature of the supply air only when the indoor humidity is in a favorable state so that the room can be kept comfortable; therefore, the humidity environment of the indoor air does not become uncomfortable due to the moderation of the blowing temperature of the supply air.

In addition, during the cooling operation of the heat exchange ventilator 110, the moderation operation control unit 21 can perform control such that the blowing temperature moderation operation is performed only when the supply air humidity is lower than or equal to the indoor humidity. This enables the heat exchange ventilator 110 to moderate the blowing temperature of the supply air only when the indoor humidity is in a favorable state so that the room can be kept comfortable; therefore, the humidity environment of the indoor air does not become uncomfortable due to the moderation of the blowing temperature of the supply air.

Thus, in the fourth embodiment, it is possible to moderate the blowing temperature of the supply air in consideration of the humidity environment of the indoor air, and to prevent the humidity environment of the indoor air from becoming uncomfortable due to the blowing temperature moderation operation.

Note that the control described in the third embodiment and the control described in the fourth embodiment can be executed in combination.

Fifth Embodiment

Figure 13:
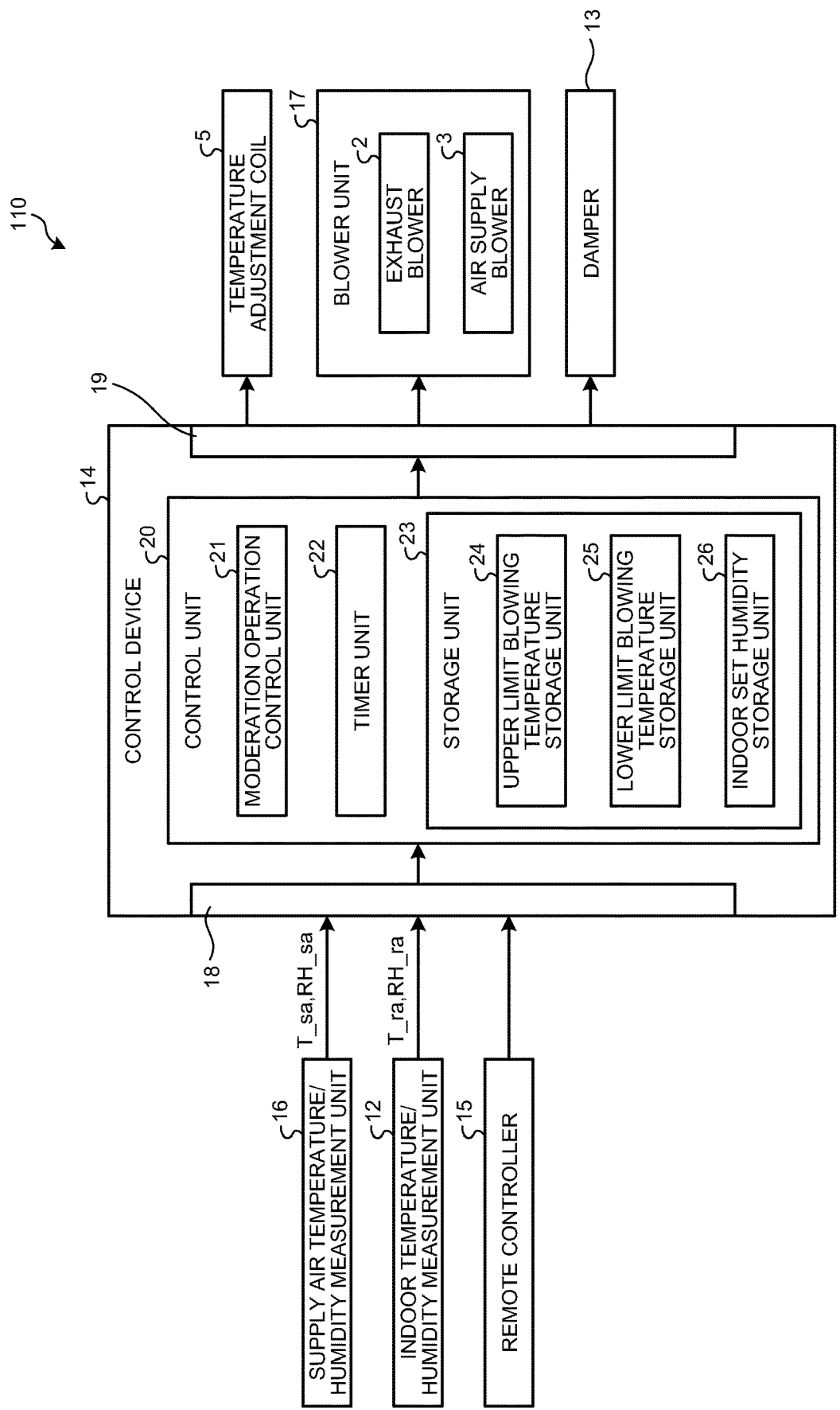
FIG. 13 is a diagram illustrating a functional configuration related to the operation of a heat exchange ventilator according to a fifth embodiment of the present invention.

FIG. 13 is a diagram illustrating a functional configuration related to the operation of the heat exchange ventilator 110 according to a fifth embodiment of the present invention. In the blowing temperature moderation operation according to the fifth embodiment, the control unit 20 stores an indoor set humidity, and determines whether to enable the blowing temperature moderation operation based on the humidity of the indoor air before performing the blowing temperature moderation operation described in the first or second embodiment. In the fifth embodiment, the indoor relative humidity RH_ra or the indoor absolute humidity AH_ra, which is an indoor humidity obtained as the result of a measurement in the indoor temperature/humidity measurement unit 12, is compared with the indoor set humidity, whereby it is determined whether to enable the blowing temperature moderation operation.

As in the third embodiment, the indoor set humidity is a target value set for the humidity of the indoor air, which is sent from the remote controller 15 to the control unit 20 via the input interface 18, and is set and stored in the indoor set humidity storage unit 26 of the storage unit 23 under the control of the control unit 20. The indoor set humidity can be set as the indoor set relative humidity RH_set, i.e. set humidity expressed as relative humidity, or the indoor set absolute humidity AH_set, i.e. set humidity expressed as absolute humidity. The indoor set humidity can be changed to any value using the remote controller 15 via the input interface 18. In a case where another control of the heat exchange ventilator 110 independent of the blowing temperature moderation operation according to the fifth embodiment uses an indoor set humidity, the indoor set humidity set in that control may be applied here.

Figure 14:
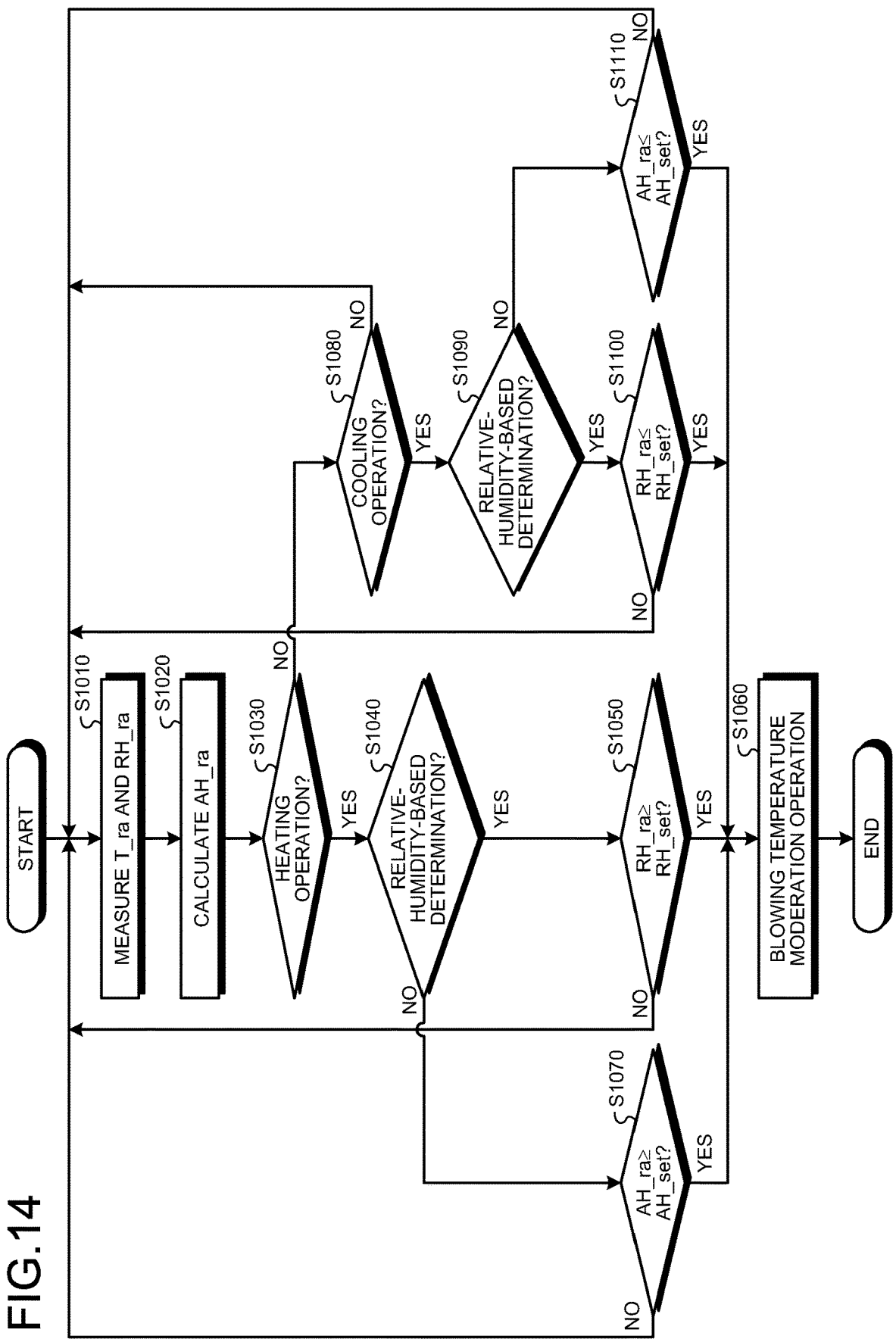
FIG. 14 is a flowchart illustrating a procedure for the blowing temperature moderation operation of the heat exchange ventilator according to the fifth embodiment of the present invention.

FIG. 14 is a flowchart illustrating a procedure for the blowing temperature moderation operation of the heat exchange ventilator 110 according to the fifth embodiment of the present invention. In the control of the blowing temperature moderation operation of the heat exchange ventilator 110 according to the fifth embodiment described below, the blowing temperature moderation operation is performed based on the result of determining whether to enable the blowing temperature moderation operation based on the humidity of the indoor air. The blowing temperature moderation control in the blowing temperature moderation operation is the same as that of either the first embodiment or the second embodiment described above.

First, in step S1010, the indoor temperature/humidity measurement unit 12 measures the indoor temperature T_ra and the indoor relative humidity RH_ra at predetermined measurement intervals. The indoor temperature/humidity measurement unit 12 transmits information on the measured indoor temperature T_ra and information on the measured indoor relative humidity RH_ra to the moderation operation control unit 21. After step S1010, the procedure proceeds to step S1020. In a case where another control of the heat exchange ventilator 110 independent of the blowing temperature moderation operation according to the fifth embodiment uses results of measurement in the indoor temperature/ humidity measurement unit 12, the results of measurement used in that control may be applied here.

In step S1020, the moderation operation control unit 21 calculates the indoor absolute humidity AH_ra from the indoor temperature T_ra and the indoor relative humidity RH_ra. Note that if the indoor temperature/humidity measurement unit 12 is capable of directly measuring the indoor absolute humidity AH_ra, the calculation of the indoor absolute humidity AH_ra may be skipped. After step S1020, the procedure proceeds to step S1030.

The indoor absolute humidity AH_ra is calculated with Formula (6) above.

In step S1030, the moderation operation control unit 21 determines whether the current operation mode of the temperature adjustment coil 5 is heating operation. Determining in step S1030 that the operation mode is heating operation corresponds to Yes in step S1030, in which case the procedure proceeds to step S1040. Determining in step S1030 that the operation mode is not heating operation corresponds to No in step S1030, in which case the procedure proceeds to step S1080.

In step S1040, the moderation operation control unit 21 determines whether to perform the relative-humidity-based determination of determining whether to enable the blowing temperature moderation operation using the indoor relative humidity RH_ra. Determining in step S1040 to perform the relative-humidity-based determination corresponds to Yes in step S1040, in which case the procedure proceeds to step S1050. Determining in step S1040 not to perform the relative-humidity-based determination corresponds to No in step S1040, in which case the procedure proceeds to step S1070.

Determination information for determining whether the moderation operation control unit 21 performs the relative-humidity-based determination of determining whether to enable the blowing temperature moderation operation using the indoor relative humidity RH_ra or the absolute-humidity-based determination of determining whether to enable the blowing temperature moderation operation using the indoor absolute humidity AH_ra is sent from the remote controller 15 to the moderation operation control unit 21 via the input interface 18, and is set and stored in the moderation operation control unit 21. The determination information can be freely changed using the remote controller 15 via the input interface 18.

In step S1050, the moderation operation control unit 21 determines whether the indoor relative humidity RH_ra is higher than or equal to the indoor set relative humidity RH_set, which is the indoor set humidity. Determining in step S1050 that the indoor relative humidity RH_ra is higher than or equal to the indoor set relative humidity RH_set corresponds to Yes in step S1050, in which case the procedure proceeds to step S1060. Determining in step S1050 that the indoor relative humidity RH_ra is lower than the indoor set relative humidity RH_set corresponds to No in step S1050, in which case the procedure returns to step S1010.

In step S1060, the heat exchange ventilator 110 shifts to the blowing temperature moderation operation. That is, the moderation operation control unit 21 starts to control the blowing temperature moderation operation. The blowing temperature moderation operation and the blowing temperature moderation control are the same as those in the first or second embodiment described above; therefore, the procedure proceeds to step S310 in FIG. 6 or step S510 in FIG. 7.

In step S1070, the moderation operation control unit 21 determines whether the indoor absolute humidity AH_ra is higher than or equal to the indoor set absolute humidity AH_set, which is the indoor set humidity. Determining in step S1070 that the indoor absolute humidity AH_ra is higher than or equal to the indoor set absolute humidity AH_set corresponds to Yes in step S1070, in which case the procedure proceeds to step S1060. Determining in step S1070 that the indoor absolute humidity AH_ra is lower than the indoor set absolute humidity AH_set corresponds to No in step S1070, in which case the procedure returns to step S1010.

The indoor set humidity used in steps S1050 and S1070 when the current operation mode of the temperature adjustment coil 5 is heating operation is a third indoor set humidity.

In step S1080, the moderation operation control unit 21 determines whether the current operation mode of the temperature adjustment coil 5 is cooling operation. Determining in step S1080 that the operation mode is cooling operation corresponds to Yes in step S1080, in which case the procedure proceeds to step S1090. Determining in step S1080 that the operation mode is not cooling operation corresponds to No in step S1080, in which case the procedure returns to step S1010.

In step S1090, the moderation operation control unit 21 determines whether to perform the relative-humidity-based determination of determining whether to enable the blowing temperature moderation operation with the indoor relative humidity RH_ra. Determining in step S1090 to perform the relative-humidity-based determination corresponds to Yes in step S1090, in which case the procedure proceeds to step S1100. Determining in step S1090 not to perform the relative-humidity-based determination corresponds to No in step S1090, in which case the procedure proceeds to step S1110.

In step S1100, the moderation operation control unit 21 determines whether the indoor relative humidity RH_ra is lower than or equal to the indoor set relative humidity RH_set, which is the indoor set humidity. Determining in step S1100 that the indoor relative humidity RH_ra is lower than or equal to the indoor set relative humidity RH_set corresponds to Yes in step S1100, in which case the procedure proceeds to step S1060. Determining in step S1100 that the indoor relative humidity RH_ra is higher than the indoor set relative humidity RH_set corresponds to No in step S1100, in which case the procedure returns to step S1010.

Note that the indoor set relative humidity RH_set in step S1100 may be a value different from the indoor set relative humidity RH_set in step S1050.

In step S1110, the moderation operation control unit 21 determines whether the indoor absolute humidity AH_ra is lower than or equal to the indoor set absolute humidity AH_set, which is the indoor set humidity. Determining in step S1110 that the indoor absolute humidity AH_ra is lower than or equal to the indoor set absolute humidity AH_set corresponds to Yes in step S1110, in which case the procedure proceeds to step S1060.

Determining in step S1110 that the indoor absolute humidity AH_ra is higher than the indoor set absolute humidity AH_set corresponds to No in step S1110, in which case the procedure returns to step S1010.

The indoor set humidity used in steps S1100 and S1110 when the current operation mode of the temperature adjustment coil 5 is cooling operation is a fourth indoor set humidity. Note that the indoor set absolute humidity AH_set in step S1110 may be a value different from the indoor set absolute humidity AH_set in step S1070.

As described above, in the fifth embodiment, whether to enable the blowing temperature moderation operation is determined by comparing the indoor set relative humidity RH_set, which is the indoor set humidity, with the indoor relative humidity RH_ra, or by comparing the indoor set absolute humidity AH_set, which is the indoor set humidity, with the indoor absolute humidity AH_ra.

By performing such a process, the moderation operation control unit 21 can perform control such that the blowing temperature moderation operation is performed only when the indoor humidity, which is the humidity of the indoor air, is higher than or equal to the indoor set humidity during the heating operation of the heat exchange ventilator 110. This enables the heat exchange ventilator 110 to moderate the blowing temperature of the supply air only when the indoor humidity is in a favorable state so that the room can be kept comfortable; therefore, the humidity environment of the indoor air does not become uncomfortable due to the moderation of the blowing temperature of the supply air.

In addition, during the cooling operation of the heat exchange ventilator 110, the moderation operation control unit 21 can perform control such that the blowing temperature moderation operation is performed only when the indoor humidity is lower than or equal to the indoor set humidity. This enables the heat exchange ventilator 110 to moderate the blowing temperature of the supply air only when the indoor humidity is in a favorable state so that the room can be kept comfortable; therefore, the humidity environment of the indoor air does not become uncomfortable due to the moderation of the blowing temperature of the supply air.

Thus, in the fifth embodiment, it is possible to moderate the blowing temperature of the supply air in consideration of the humidity environment of the indoor air, and to prevent the humidity environment of the indoor air from becoming uncomfortable due to the blowing temperature moderation operation.

Note that the control described in the third embodiment, the control described in the fourth embodiment, and the control described in the fifth embodiment can be executed in combination.

Next, a hardware configuration of the control unit 20 according to the first embodiment of the present invention will be described. The function of each unit of the control unit 20 is implemented by processing circuitry. The processing circuitry may be implemented by dedicated hardware or may be a control circuit using a central processing unit (CPU).

Figure 15:
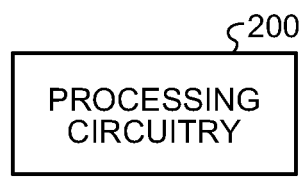
FIG. 15 is a diagram illustrating dedicated hardware for implementing the functions of the control unit according to the first embodiment of the present invention.

In a case where the above processing circuitry is implemented by dedicated hardware, the processing circuitry is implemented by processing circuitry 200 illustrated in FIG. 15. FIG. 15 is a diagram illustrating dedicated hardware for implementing the functions of the control unit 20 according to the first embodiment of the present invention. The processing circuitry 200 is a single circuit, a composite circuit, a programmed processor, a parallel programmed processor, an application specific integrated circuit (ASIC), a field programmable gate array (FPGA), or a combination thereof.

Figure 16:
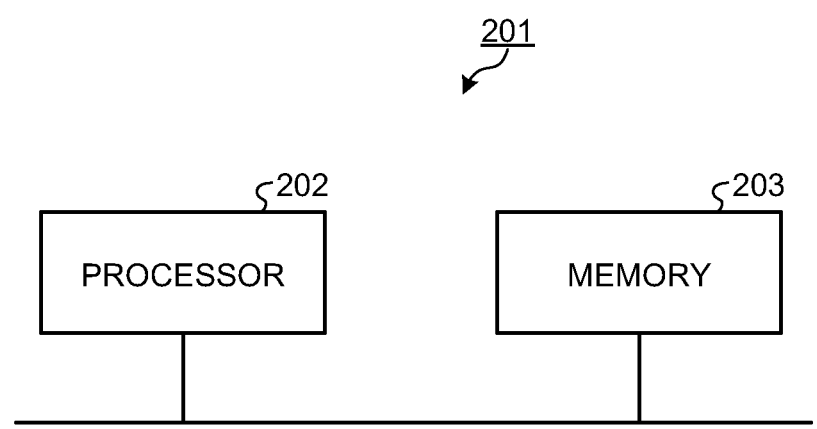
FIG. 16 is a diagram illustrating a configuration of a control circuit for implementing the functions of the control unit according to the first embodiment of the present invention.

In a case where the above processing circuitry is implemented by a control circuit using a CPU, this control circuit is, for example, a control circuit 201 having the configuration illustrated in FIG. 16. FIG. 16 is a diagram illustrating a configuration of the control circuit 201 for implementing the functions of the control unit 20 according to the first embodiment of the present invention. As illustrated in FIG. 16, the control circuit 201 includes a processor 202 and a memory 203. The processor 202 is a CPU, and is also called a central processing device, a processing device, an arithmetic device, a microprocessor, a microcomputer, a digital signal processor (DSP), or the like. Examples of the memory 203 include a non-volatile or volatile semiconductor memory, a magnetic disk, a flexible disk, an optical disc, a compact disc, a mini disc, a digital versatile disc (DVD), and the like. Examples of non-volatile or volatile semiconductor memories include a random access memory (RAM), a read only memory (ROM), a flash memory, an erasable programmable ROM (EPROM), an electrically EPROM (EEPROM, registered trademark), and the like.

In a case where the above processing circuitry is implemented by the control circuit 201, the processor 202 reads and executes the program corresponding to the process of each component stored in the memory 203, thereby implementing the processing circuitry. The memory 203 is also used as a temporary memory for each process executed by the processor 202.

The configurations described in the above-mentioned embodiments indicate examples of the contents of the present invention. The techniques of the embodiments can be combined with each other and with another well-known technique, and some of the configurations can be omitted or changed in a range not departing from the gist of the present invention.

REFERENCE SIGNS LIST 1 main body; 1a casing; 1b heat exchange exhaust air passage; 1c supply air passage; 1d bypass exhaust air passage; 2 exhaust blower; 3 air supply blower; 4 total heat exchanger; 5 temperature adjustment coil; 6 humidifier; 7 exhaust outlet; 8 air supply outlet; 9 air supply inlet; 10 exhaust inlet; 12 indoor temperature/humidity measurement unit; 13 damper; 14 control device; 15 remote controller; 16 supply air temperature/humidity measurement unit; 17 blower unit; 18 input interface; 19 output interface; 20 control unit; 21 moderation operation control unit; 22 timer unit; 23 storage unit; 24 upper limit blowing temperature storage unit; 25 lower limit blowing temperature storage unit; 26 indoor set humidity storage unit; 100, 110 heat exchange ventilator; 200 processing circuitry; 201 control circuit; 202 processor; 203 memory.

The invention claimed is:

1. A heat exchange ventilator comprising:
a casing in which an exhaust air passage through which indoor air is discharged out of a room and a supply air passage through which outdoor air is supplied into the room are independently formed;
a blower unit including an exhaust blower to generate an exhaust airflow going through the exhaust air passage and an air supply blower to generate a supply airflow going through the supply air passage;
a heat exchanger to cause heat exchange between the supply airflow and the exhaust airflow;
a temperature adjustment coil provided downstream of the heat exchanger in the supply air passage to heat or cool supply air that is the outdoor air passing through the supply air passage;
a supply air temperature measurement unit provided downstream of the temperature adjustment coil in the supply air passage to measure a supply air temperature that is a temperature of the supply air passed through the temperature adjustment coil; and
control circuitry to control operation of the blower unit and the temperature adjustment coil, wherein the control circuitry performs blowing temperature moderation control of performing ventilation by controlling operation of at least one of the blower unit and the temperature adjustment coil so as to moderate a blowing temperature of the supply air blown out from the casing, the controlling being based on a result of comparison between a lower limit blowing temperature defining a lower limit of the blowing temperature of the supply air blown out from the casing, an upper limit blowing temperature defining an upper limit of the blowing temperature of the supply air blown out from the casing, and the supply air temperature, and the control circuitry is configured to:

during the heating operation of the temperature adjustment coil, compare the upper limit blowing temperature with the supply air temperature, and change a heating capacity of the temperature adjustment coil to a value selected from a plurality of values on the basis of the comparison between the upper limit blowing temperature and the supply air temperature, the plurality of values including three or more values to be selected, so as to make an amount of heating in the temperature adjustment coil smaller as the supply air temperature is closer to the upper limit blowing temperature; and during the cooling operation of the temperature adjustment coil, compare the lower limit blowing temperature with the supply air temperature, and change a cooling capacity of the temperature adjustment coil to a value selected from a plurality of values on the basis of the comparison between the lower limit blowing temperature and the supply air temperature, the plurality of values including three or more values to be selected, so as to make an amount of cooling in the temperature adjustment coil smaller as the supply air temperature is closer to the lower limit blowing temperature.

2. The heat exchange ventilator according to claim 1, wherein the control circuitry is configured to:

during a heating operation of the temperature adjustment coil, perform control to make an amount of heating in the temperature adjustment coil smaller than immediately before performing the blowing temperature moderation control; and during a cooling operation of the temperature adjustment coil, perform control to make an amount of cooling in the temperature adjustment coil smaller than immediately before performing the blowing temperature moderation control.

3. The heat exchange ventilator according to claim 1, wherein the control circuitry performs control to make an air volume of the blower unit larger than or smaller than immediately before performing the blowing temperature moderation control.

4. The heat exchange ventilator according to claim 1, comprising:

a bypass exhaust air passage formed inside the casing, the exhaust airflow being discharged out of the room bypassing the heat exchanger through the bypass exhaust air passage; and a damper provided in the exhaust air passage and movable between a position where the bypass exhaust air passage is open and a position where the bypass exhaust air passage is closed, wherein the control circuitry performs control to move the damper to either the position where the bypass exhaust air passage is open or the position where the bypass exhaust air passage is closed.

5. The heat exchange ventilator according to claim 4, comprising:

a humidifier provided downstream of the temperature adjustment coil in the supply air passage to humidify the supply air passed through the temperature adjustment coil; and an indoor temperature/humidity measurement unit provided upstream of the heat exchanger in the exhaust air passage to measure a temperature and a humidity of the indoor air passing through the exhaust air passage, wherein the control circuitry calculates a dew point of an air environment in the room based on the temperature and the humidity measured by the indoor temperature/humidity measurement unit, and controls operation of at least one of the blower unit, the temperature adjustment coil, and the damper such that the supply air temperature does not fall to or below the dew point.

6. The heat exchange ventilator according to claim 1, wherein the control circuitry controls the amount of heating or cooling in the temperature adjustment coil in a plurality of stages based on a ratio of the supply air temperature to the upper limit blowing temperature or the lower limit blowing temperature.

7. The heat exchange ventilator according to claim 1, wherein the control circuitry controls an air volume of the blower unit in a plurality of stages based on a ratio of the supply air temperature to the upper limit blowing temperature or the lower limit blowing temperature.

8. The heat exchange ventilator according to claim 1, comprising:

a supply air humidity measurement unit provided downstream of the temperature adjustment coil in the supply air passage to measure a supply air humidity that is a humidity of the supply air passed through the temperature adjustment coil; and an indoor humidity measurement unit provided upstream of the heat exchanger in the exhaust air passage to measure a humidity of the indoor air passing through the exhaust air passage, wherein the control circuitry is configured to: during the heating operation of the temperature adjustment coil, compare an indoor humidity with the supply air humidity, the indoor humidity being the humidity of the indoor air obtained as a result of measurement in the indoor humidity measurement unit; and shift to the blowing temperature moderation control when the supply air humidity is higher than or equal to the indoor humidity.

9. The heat exchange ventilator according to claim 1, comprising:

a supply air humidity measurement unit provided downstream of the temperature adjustment coil in the supply air passage to measure a supply air humidity that is a humidity of the supply air passed through the temperature adjustment coil; and an indoor humidity measurement unit provided upstream of the heat exchanger in the exhaust air passage to measure a humidity of the indoor air passing through the exhaust air passage, wherein the control circuitry is configured to: during the cooling operation of the temperature adjustment coil, compare an indoor humidity with the supply air humidity, the indoor humidity being the humidity of the indoor air obtained as a result of measurement in the indoor humidity measurement unit; and shift to the blowing temperature moderation control when the supply air humidity is lower than or equal to the indoor humidity.

10. The heat exchange ventilator according to claim 1, comprising
a supply air humidity measurement unit provided downstream of the temperature adjustment coil in the supply air passage to measure a humidity of the supply air passed through the temperature adjustment coil, wherein
the control circuitry is configured to: during the heating operation of the temperature adjustment coil, compare a supply air humidity with a first indoor set humidity, the supply air humidity being the humidity of the supply air passed through the temperature adjustment coil obtained as a result of measurement in the supply air humidity measurement unit, the first indoor set humidity being a target humidity value of the indoor air set in advance in the control circuitry; and shift to the blowing temperature moderation control when the supply air humidity is higher than or equal to the first indoor set humidity.

11. The heat exchange ventilator according to claim 1, comprising
a supply air humidity measurement unit provided downstream of the temperature adjustment coil in the supply air passage to measure a humidity of the supply air passed through the temperature adjustment coil, wherein
the control circuitry is configured to: during the cooling operation of the temperature adjustment coil, compare a supply air humidity with a second indoor set humidity, the supply air humidity being the humidity of the supply air passed through the temperature adjustment coil obtained as a result of measurement in the supply air humidity measurement unit, the second indoor set humidity being a target humidity value of the indoor air set in advance in the control circuitry; and shift to the blowing temperature moderation control when the supply air humidity is lower than or equal to the second indoor set humidity.

12. The heat exchange ventilator according to claim 1, comprising
an indoor humidity measurement unit provided upstream of the heat exchanger in the exhaust air passage to measure a humidity of the indoor air passing through the exhaust air passage, wherein
the control circuitry is configured to: during the heating operation of the temperature adjustment coil, compare an indoor humidity with a third indoor set humidity, the indoor humidity being the humidity of the indoor air obtained as a result of measurement in the indoor humidity measurement unit, the third indoor set humidity being a target humidity value of the indoor air set in advance in the control circuitry; and shift to the blowing temperature moderation control when the indoor humidity is higher than or equal to the third indoor set humidity.

13. The heat exchange ventilator according to claim 1, comprising
an indoor humidity measurement unit provided upstream of the heat exchanger in the exhaust air passage to measure a humidity of the indoor air passing through the exhaust air passage, wherein
the control circuitry is configured to: during the cooling operation of the temperature adjustment coil, compare an indoor humidity with a fourth indoor set humidity, the indoor humidity being the humidity of the indoor air obtained as a result of measurement in the indoor humidity measurement unit, the fourth indoor set humidity being a target humidity value of the indoor air set in advance in the control circuitry; and shift to the blowing temperature moderation control when the indoor humidity is lower than or equal to the fourth indoor set humidity.

14. The heat exchange ventilator according to claim 1, wherein
while the temperature adjustment coil is in thermo-on, the control circuitry performs control to switch the temperature adjustment coil to thermo-off in response to a time during which the supply air temperature is higher than the upper limit blowing temperature or a time during which the supply air temperature is lower than the lower limit blowing temperature lasting for a first predetermined time or more determined in advance.

15. The heat exchange ventilator according to claim 14, wherein
the control circuitry performs control to switch the temperature adjustment coil to thermo-off in response to the time during which the supply air temperature is higher than the upper limit blowing temperature or the time during which the supply air temperature is lower than the lower limit blowing temperature exceeding the first predetermined time determined in advance, and then switch the temperature adjustment coil to thermo-on after a lapse of a second predetermined time determined in advance.

16. The heat exchange ventilator according to claim 1, wherein
while the temperature adjustment coil is in thermo-on, the control circuitry performs control to keep the temperature adjustment coil in thermo-on until the time during which the supply air temperature is higher than the upper limit blowing temperature or the time during which the supply air temperature is lower than the lower limit blowing temperature lasts for the first predetermined time or more determined in advance.

* * * * *